(12) United States Patent
Eatherton et al.

(10) Patent No.: US 6,560,610 B1
(45) Date of Patent: May 6, 2003

(54) DATA STRUCTURE USING A TREE BITMAP AND METHOD FOR RAPID CLASSIFICATION OF DATA IN A DATABASE

(75) Inventors: William N. Eatherton, Sunnyvale, CA (US); Zubin Dittia, Sunnyvale, CA (US)

(73) Assignee: Washington University, St. Louis, MO (US)

( * ) Notice: Subject to any disclaimer, the term of this patent is extended or adjusted under 35 U.S.C. 154(b) by 0 days.

(21) Appl. No.: 09/371,907

(22) Filed: Aug. 10, 1999

(51) Int. Cl.$^7$ .............................. G06F 17/00; G06F 7/00
(52) U.S. Cl. ................... 707/104.1; 707/101; 707/102; 707/103 R
(58) Field of Search .................. 707/1–10, 100–104.1, 707/200–206, 500–542; 709/1, 200–203, 238, 247, 310–318, 328–332

(56) References Cited

U.S. PATENT DOCUMENTS

| | | | |
|---|---|---|---|
| 5,088,032 A | | 2/1992 | Bosack |
| 5,319,763 A | | 6/1994 | Ho et al. |
| 5,481,540 A | | 1/1996 | Huang |
| 5,515,370 A | | 5/1996 | Rau |
| 5,528,701 A | * | 6/1996 | Aref .......................... 382/178 |
| 5,651,099 A | * | 7/1997 | Konsella ..................... 395/13 |
| 5,721,899 A | * | 2/1998 | Namba ....................... 395/603 |
| 5,740,171 A | | 4/1998 | Mazzola et al. |
| 5,781,431 A | * | 7/1998 | Duret et al. .................. 700/28 |
| 5,781,722 A | * | 7/1998 | Wilkinson, III et al. ..... 395/600 |
| 5,781,772 A | | 7/1998 | Wilkinsen, III et al. |

(List continued on next page.)

FOREIGN PATENT DOCUMENTS

| | | | | |
|---|---|---|---|---|
| SE | 99/00788 | * | 11/1999 | ........... H04L/12/56 |

OTHER PUBLICATIONS

William N. Eatherton, "Hardware–based Internet Protocol Prefix Lookups,", A thesis for Master of Science to the Sever Institute of Washington University, May 1999, 119 pages.*
Donald R. Morrison, "Patricia—Practical Algorithm to Retrieve Information Coded in Alphanumeric," Journal of the ACM, vol. 15, No. 4, Oct. 1968, pp. 514–534.
Waldvogel Et Al., "Scalable High Speed IP Routing Lookups," Proc. SIGCOMM '97, ACM, 1997, pp. 25–36.
Lampson Et Al., "IP Lookups Using Multiway and Multicolumn Search," Proc. Infocom 98, Mar. 1998, 24 pages.

(List continued on next page.)

*Primary Examiner*—John Breene
*Assistant Examiner*—Linh Black
(74) *Attorney, Agent, or Firm*—The Law Office of Kirk D. Williams

(57) ABSTRACT

In random access memory, a data structure of trie elements of compact and fixed size is provided in order to store elements of a hierarchical prefix-type data structure such that the data structure can be searched quickly. A trie element according to the invention contains the data in one stride of the search through the prefix-type data structure. According to the invention, the trie element may contain 1) a description of the tree structure associated with the trie element, 2) a description of the links to the next level trie element, and 3) a pointer to the storage location of the next level trie element. The prefix structure has a first level trie element, and at least one second level trie element. The trie element includes a first code of the first level trie element describing the prefixes contained in the first level trie element, a second code specifying paths between the first level trie element and all children of the first level trie element (such children are second level trie elements), and a pointer for linking the first level trie element with one of the second level trie elements. Each of the first and second trie elements and the pointer are of a fixed, predefined size.

36 Claims, 13 Drawing Sheets

U.S. PATENT DOCUMENTS

| | | | |
|---|---|---|---|
| 5,809,501 A | | 9/1998 | Noven |
| 5,829,004 A | * | 10/1998 | Au ............................ 707/100 |
| 5,842,040 A | | 11/1998 | Hughes et al. |
| 5,848,416 A | * | 12/1998 | Tikkanen ................... 707/101 |
| 5,884,297 A | | 3/1999 | Noven |
| 5,898,689 A | | 4/1999 | Kumar et al. |
| 5,920,886 A | | 7/1999 | Feldmeier |
| 5,930,359 A | | 7/1999 | Kempke et al. |
| 5,956,336 A | | 9/1999 | Loschke et al. |
| 5,995,971 A | * | 11/1999 | Douceur et al. ............ 707/100 |
| 6,000,008 A | | 12/1999 | Simcoe |
| 6,018,524 A | | 1/2000 | Turner et al. |
| 6,041,053 A | * | 3/2000 | Douceur et al. ............ 370/389 |
| 6,061,368 A | | 5/2000 | Hitzelberger |
| 6,067,574 A | | 5/2000 | Tzeng |
| 6,091,725 A | | 7/2000 | Cheriton et al. |
| 6,097,724 A | | 8/2000 | Kartalopoulos |
| 6,115,716 A | * | 9/2000 | Tikkanen et al. ............. 707/10 |
| 6,141,738 A | | 10/2000 | Munter et al. |
| 6,148,364 A | | 11/2000 | Srinivasan et al. |
| 6,181,698 B1 | | 1/2001 | Hariguchi |
| 6,236,658 B1 | | 5/2001 | Essbaum et al. |
| 6,237,061 B1 | | 5/2001 | Srinivasan et al. |
| 6,243,667 B1 | | 6/2001 | Kerr et al. |
| 6,289,414 B1 | | 9/2001 | Feldmeier et al. |
| 6,295,576 B1 | | 9/2001 | Ogura et al. |
| 6,298,339 B1 | * | 10/2001 | Bjornson ........................ 707/3 |
| 6,307,855 B1 | | 10/2001 | Hariguchi |
| 6,334,153 B2 | * | 12/2001 | Boucher et al. ............ 709/230 |
| 6,356,951 B1 | * | 3/2002 | Gentry, Jr. .................. 709/217 |

OTHER PUBLICATIONS

V. Srinivasan and George Varghese, "Faster IP Lookups using Controlled Prefix Expansion," ACM SIGMETRICS Performance Evaluation Review, vol. 26 No. 1, Jun. 1998, p. 1–10.

Stefan Nilsson and Gunnar Karlsson, "Fast Address Look–up for Internet Routers," Proceedings of IEEE Broadband Communications, Apr. 1998, 12 pages.

Lampson Et Al., "IP Lookups Using Multiway and Multicolumn Search," IEEE Transactions on Networking, vol. 7, No. 3, Jun. 1999, pp. 324–334.

Jon P. Wade and Charles G. Sodini, "A Ternary Content Addressable Search Engine," IEEE Journal of Solid–State Circuits, vol. 24, No. 4, Aug. 1989, pp. 1003–1013.

Teuvo Kohonen, Content–Addressable Memories, 1987, pp. 128–129 and 142–144, Springer–Verlag, New York.

Brian Dipert, ed., "Special–purpose SRAMs Smooth the Ride," EDN, Jun. 24, 1999, pp. 93–104.

"Extending the LANCAM Comparand," Application Brief AB–N3, Rev. 1.0a Draft, Music Semiconductors, Milpitas, CA, Sep. 30, 1998, 4 pages.

"Advantages of CAM in ASIC–Based Network Address Processing," Application Brief AB–N11, Rev. 1.2a Draft, Music Semiconductors, Milpitas, CA, Sep. 30, 1998, 4 pages.

"Virtual Memory Applications of the MU9C1480A LANCAM," Application Note AN–N3, Rev. 1a, Music Semiconductors, Milpitas, CA, Sep. 30, 1998, 12 pages.

"Using the MU9C1965A LANCAM MP for Data Wider than 128 Bits," Application Note AN–N19, Rev. 1a, Music Semiconductors, Milpitas, CA, Sep. 30, 1998, 16 pages.

"Fast IPv4 and IPv4 CIDR Address Translation and Filtering Using the MUAC Routing CoProcessor (RCP)," Application Note AN–N25, Rev. 0a, Music Semiconductors, Milpitas, CA, Oct. 1, 1998, 16 pages.

"Using MUSIC Devices and RCPs for IP Flow Recognition," Application Note AN–N27, Rev. 0, Music Semiconductors, Milpitas, CA, Oct. 21, 1998, 20 pages.

"Wide Ternary Searches Using Music CAMs and RCPs," Application Note AN–N31, Rev. 0, Music Semiconductors, Milpitas, CA, Apr. 13, 1999, 8 pages.

* cited by examiner

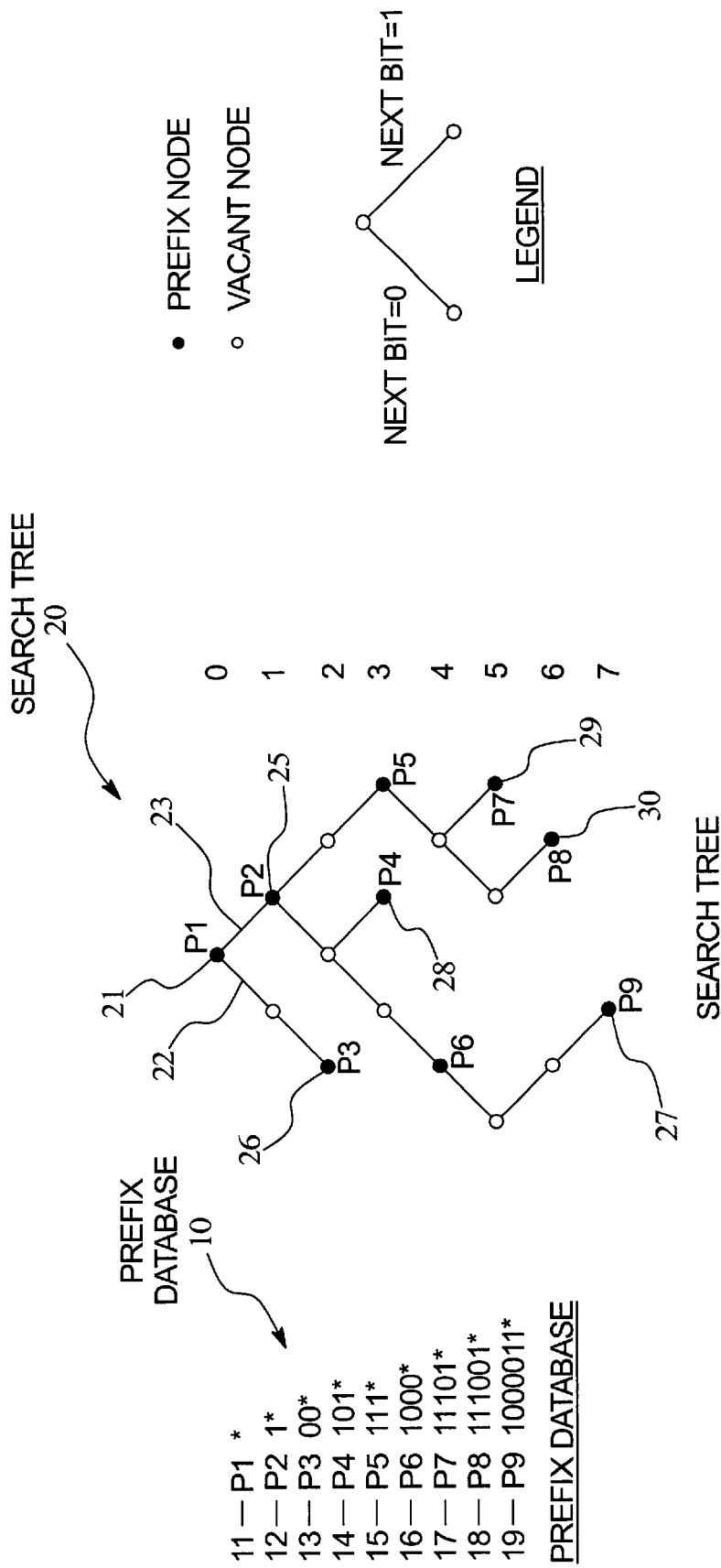

FIG. 12A

| DEST. PREFIX | SRC. PREFIX | PROTO | SRC. PORT | DEST. PORT | ACTION CODE | | |
|---|---|---|---|---|---|---|---|
| 01* | — | — | — | — | 23 | ← 950 | TABLE 948 |
| 1010* | — | — | — | — | 15 | ← 952 | IPv4 unicast destination prefix |
| 101011* | — | — | — | — | 23 | ← 954 | |
| 0101001* | — | — | — | — | 36 | ← 956 | |
| 01101101 | — | — | — | — | 121 | ← 958 | |
| 01011011 | 1010* | — | — | — | 131 | ← 960 | IPv4 source-based tree multicast |
| 10101111 | 001011* | — | — | — | 235 | ← 962 | |
| 01101011 | 1101001* | — | — | — | 17 | ← 964 | |
| 01010101 | 11101101 | — | — | — | 12 | ← 966 | |
| 11111011 | 01011011 | — | — | — | 412 | ← 968 | |
| 01101101 | 11011010 | — | — | — | 111 | ← 970 | IPv4 VPNs or tunnels |
| 11001011 | 10100111 | — | — | — | 212 | ← 972 | |
| 01101110 | 10100101 | — | — | — | 313 | ← 974 | |
| 10101111 | 01110111 | — | — | — | 316 | ← 976 | |
| 10011110 | 10100101 | TCP | 34 | 13 | 423 | ← 978 | |
| 10101111 | 01101110 | UDP | 53 | 11 | 321 | ← 980 | IPv4 end-to-end flow for support of QoS |
| 01010101 | 01110001 | TCP | 11 | 41 | 123 | ← 982 | |
| 01101101 | 01110111 | TCP | 235 | 25 | 312 | ← 984 | |
| 11011010 | 10011110 | UDP | 44 | 32 | 21 | ← 986 | |
| 10100111 | 01011110 | TCP | 20-55 | 22 | 42 | ← 988 | |
| 01011110 | 10100101 | TCP | 13-15 | 11-24 | 51 | ← 990 | IPv4 security filters |
| 101* | 0001* | UDP | * | 33 | 77 | ← 992 | |
| 01011011 | 01111* | TCP | 11-24 | 43-50 | 56 | ← 994 | |
| 10111* | 10011110 | * | * | * | 65 | ← 996 | |
| * | | | | | 31 | ← 998 | |

946 HEADER FIELDS: P SP DP SA DA

| DA* | DESTINATION PREFIX | <32 BITS |
| DA | DESTINATION ADDRESS | 32 BITS |
| SA* | SOURCE PREFIX | <32 BITS |
| SA | SOURCE ADDRESS | 32 BITS |
| P | PROTOCOL ID | 8 BITS |
| SP | SOURCE PORT NUMBER | 16 BITS |
| DP | DESTINATION PORT NUMBER | 16 BITS |

DATA STRUCTURE USING A TREE BITMAP AND METHOD FOR RAPID CLASSIFICATION OF DATA IN A DATABASE

STATEMENT AS TO RIGHTS TO INVENTIONS MADE UNDER FEDERALLY SPONSORED RESEARCH AND DEVELOPMENT

The invention was performed in the course of work under sponsorship of DARPA, an agency of the Department of Defense, under Contract No. DABT-63-95-C-0083, and of the National Science Foundation, under NSF Grants NCR-9714698 and ANI-9318178 of the CISE Directorate. The U.S. Government retains certain nonexclusive rights in this invention.

BACKGROUND OF THE INVENTION

This invention relates to a method for storing and managing data. More particularly this invention relates to a data structure representing a set of prefixes and a method for searching the data structure. The data structure and the search method are particularly advantageous for implementation in digital computer hardware. The primary application of current interest is to semiconductor integrated circuits used for packet classification in high-speed, multiservice Internet routers. However, the technique may be useful in a variety of applications involving data that needs to be prioritized or wherein structure in the data needs to be determined and then to be classified. As a result of classification of the data, action on data can be taken more quickly and efficiently.

In the past, in the packet-switched networking field, Internet Protocol (IP) traffic handling processes have required relatively complex searches and analyses of packet header information to develop routing and processing instructions. Recently, IP destination address lookup issues relating to techniques for routing a packet to a destination have received a great deal of attention from the networking community. The following references may be consulted on the state of the art related to the invention herein described:

[1] M. Degermark, A. Brodnik, S. Carlsson, S. Pink, "Small Forwarding Tables for Fast Routing Lookups" Proc. ACM SIGCOMM '97, Cannes (Sep. 14–18, 1997) (describing the Lulea algorithm).

[2] V. Srinivasan, G. Varghese, "Faster IP Lookups using Controlled Prefix Expansion," Proc. SIGMETRICS '98.

A number of patents of interest on lookup algorithms are known in the art.

It is helpful to understand the background of the closest known method for searching tree structures of data. Note the following definitions:

A trie is a tree structure organized for searching.

A trie element is that portion of a tree structure at a single node.

A prefix is a string of characters that appears at the beginning of a longer string of characters.

A stride is a number of levels in a tree accessed in a single read operation.

A target string is a string of characters to be classified.

In many cases of practical interest the characters in a prefix are binary digits, i.e., ones and zeroes. In the example prefix database 10 in FIG. 1 there are nine binary prefixes 11–19 each terminated by *, a symbol which represents the remaining arbitrary binary digits in a longer, fixed-length string. If the total length of the string is k digits, then P1 represents any string of k arbitrary binary digits. Similarly, P3 represents a k-bit string that begins with 00 and is followed by any k−2 length string of binary digits.

A prefix database can be used to classify strings of characters into subsets according to which prefix a particular string matches. The prefix database structure can include exact matches with a target string, i.e., the data to be analyzed can appear in the database.

The matching process is ambiguous unless the classification requires that the matching prefix be the longest possible match in the database. For example, in FIG. 1, the 10-bit string 1000011000 matches P1, P2, P6 and P9, but only P9 is the longest, matching the first 7-bits of the 10-bit string.

A database of binary prefixes can be represented by a binary tree 20 specialized for searching. This search tree 20 is an example of a data structure called a trie and is convenient for finding the longest prefix match. Nodes (shown as small circles in FIG. 1) in the trie are labeled as Prefix Nodes or Vacant Nodes according to whether they represent a prefix or not.

The search for a match to a target string progresses by examining one bit of the target at a time. Before examining the target's first bit, a match with the Prefix Node 21 for P1 is known to exist, since P1 matches all strings. If the first bit is a 0, take the left branch 22 of the trie. If the first bit is a 1 take the right branch 23 of the trie. In either case, determine if a Prefix Node is encountered. In the example of FIG. 1 taking right branch 23 leads to a match with the Prefix Node 25 for P2.

The process proceeds by taking the left or right branch according to whether the next bit is a 0 or a 1, noting the Prefix Nodes encountered and tracing a path down the trie until either a final node 26–30 is reached (a leaf) or there is no longer a path on the trie (since the node is not in the database). In either case, the last Prefix Node found represents the longest prefix match.

The Lulea algorithm is the algorithm known to encode prefix tables most compactly. The Lulea algorithm is a scheme that uses multibit trie elements containing bitmaps to minimize wasted storage. The Lulea scheme does well in terms of worst case storage, using only 200 Kbytes of memory to store the current MAE East database in a fully structured form. (The MAE East database is a database that contains over 40,000 Internet prefixes for IP addresses and requires over 900 Kbytes of ASCII character storage in its uncompressed form.) One way to describe the Lulea scheme is to consider the database 10 of FIG. 1 remapped to the multibit trie elements 102, 104, 106, 108 as in FIG. 2A.

The various possible target strings are shown in FIG. 2A as 3-bit strides at the left of each of the trie elements 102, 104, 106 and 108. The longest matching prefix at each stride is shown in the prefix column of the trie elements in FIG. 2A. For example, the target string 111001 traces a path down the right hand side of the trie 20 in FIG. 1 to the leaf 30 and the prefix P8. In FIG. 2A the leading 111 portion of the target string selects the last entry in the trie element 102 which contains a pointer to trie element 108 where the last three bits of the target string 001 select the prefix P8.

This remapped trie 100 is called a controlled prefix expansion and is subject, in FIG. 2B, to an optimization known as "leaf pushing." Leaf pushing is intended to reduce memory requirements by making each trie element entry contain EITHER a pointer OR a prefix label but not both. Thus entries like "100" (binary) in the fifth row of the root trie element 102 of FIG. 2A which have both a pointer and a prefix label must be modified. The optimization pushes the prefix label down to the vacant leaves 124, 125, 126, 127 of the trie element 104. Since these leaves have no pointer, there is room to store a prefix label. This is shown in FIG. 2B by pointer 205 pointing from trie element 102' to trie element 104', which has P2 pushed down into the previously empty slots of trie element 104', and by pointer 208, which has P5 pushed down into the previously empty slots of trie element 108'. The occupied leaves 120, 121, 122, 123 do not receive a prefix because P6 is a longer match than P2 and therefore the shorter match can be ignored.

Conceptually the Lulea scheme starts with a leaf-pushed trie 101 and replaces, with a single value, all the consecutive entries in a trie element that have the same value. This can greatly reduce the amount of storage required in a trie element. To allow trie indexing to take place even after the elements have been compressed, a bit map with 1's corresponding to retained positions and with 0's corresponding to the removed positions is associated with each compressed element.

For example consider the partially compressed root element 102' in FIG. 2B. After leaf pushing the root element 102' has the sequence of values P3 (201), P3 (202), P1 (203), P1 (204), ptr1 (205), P4 (206), P2 (207), ptr2 (208) (where ptr1 205 is a pointer to the trie element 104' and ptr2 208 is the pointer to the trie element 108'). Referring to FIG. 2C, this sequence of values is compressed by removing redundant values and indicating by the placement of 1's in a bitmap the location of the remaining unique values. For example, original trie element 102' is replaced with a bit map (10101111) 302 indicating the removed positions P3 202 and P1 204 by 0's and a compressed list 304 comprising the prefix labels and pointers (P3 , P1 , ptr1, P4, P2, ptr2). The result of doing this for all four trie elements is shown in FIG. 2C.

The search of a trie element now consists of using a number of bits specified by the stride (e.g., 3 in this case) to index into each trie element starting with the root and continuing until a prefix label or a 0 is encountered. In the latter case, it is necessary to determine the appropriate action. For example, assume the data structure shown in FIG. 2C and a search for a target string that starts with 111111. Consider the first three bits (111) which index into the last position 208' in the root element bitmap 302. Since position 208' is the sixth bit set to 1 (counting from the left), index into the sixth entry of the compressed list 304 which is a pointer ptr2 208" to the right most trie element 108". Here, use the next 3 bits of the target string (also 111) to index into the eighth bit or last position again. Since this bit is a 0 in bitmap 401, the search is terminated but it is still necessary to retrieve the best matching prefix. This is done by counting the number of bits set before the eighth or last position (4 bits) and then indexing into the 4th entry 403 in the compressed trie element 402 which gives the action associated with prefix label P5. In the present networking art, this action is likely to be the next hop address.

The Lulea scheme specifies a trie search that uses three strides of 16, 8 and 8. Without compression, the initial 16 bit array would require 64K entries of at least 16 bits each, and the remaining strides would require the use of large 256 entry trie elements. With the compression specified in the Lulea scheme, the MAE East prefix database requires only 200 Kbytes of storage. However, the use of leaf pushing makes insertion inherently slow in the Lulea scheme, since a single update can require the modification of many elements of the trie.

In the absence of deadlines and for small prefix databases, known software methods are sufficient to search for the longest prefix match. However, for many practical applications, such as packet classification in large dynamically-updated databases, there are deadlines or time limitations. Furthermore, the prefix database can contain many tens of thousands, or soon many hundreds of thousands, of entries which can slow a search. The resulting binary trie is exceedingly large and populated only sparsely with Prefix Nodes. What is needed is a method that facilitates a rapid search and minimizes the storage required.

SUMMARY OF THE INVENTION

According to the invention, in random access memory, a data structure of trie elements of compact and fixed size is provided in order to store elements of a hierarchical prefix structure such that the data structure can be searched quickly. A trie element according to the invention contains the data in one stride of the search through the prefix data structure. According to the invention, the trie element may contain 1) a description of the tree structure associated with the trie element, 2) a description of the links to the next level trie element and 3) a pointer to the storage location of the next level trie element. The prefix data structure has a first level trie element, and at least one second level trie element. The trie element includes a first code of the first level trie element describing the prefixes contained in the first level trie element, a second code specifying paths between the first level trie element and all children of the first level trie element (such children are second level trie elements), and a pointer for linking the first level trie element with one of the second level trie elements. Each of the first and second trie elements and the pointer are of a fixed, predefined size.

The present invention represents an advance over the best algorithm that is known, the Lulea algorithm. First, the present invention uses a completely different encoding scheme that relies on two codes per trie element, with each code corresponding to an independent bitmap. Second, only one memory reference per trie element is required, as opposed to two or three per trie element in Lulea. Third, fast update times are guaranteed since the number of operations is bounded by the depth of the trie. In the Lulea scheme, a single update can cause almost the entire database to be rewritten. Fourth, unlike Lulea, the present core algorithm can be instantiated to take advantage of the structure of known memories devices.

While the invention has been disclosed with specific reference to a telecommunication application, the data structure and search method of this invention promotes rapid searching of any prefix-type database for the longest prefix match. The method is well suited to implementation in computer hardware, provides a compact storage structure, is scalable to large databases, and can be applied to a pressing problem in the design of Internet multiservice routers.

There are a number of optimizations and ramifications suitable for adjusting the specific embodiments to various specialized needs. The invention will be better understood upon reference to the following detailed description in connection with the accompanying drawings.

BRIEF DESCRIPTION OF THE DRAWINGS

FIG. 1 is a diagram illustrating prior art as background for the present invention.

FIG. 12A is an illustration of examples of various kinds of filters for packet classification.

DESCRIPTION OF SPECIFIC EMBODIMENTS

Figure 2A:
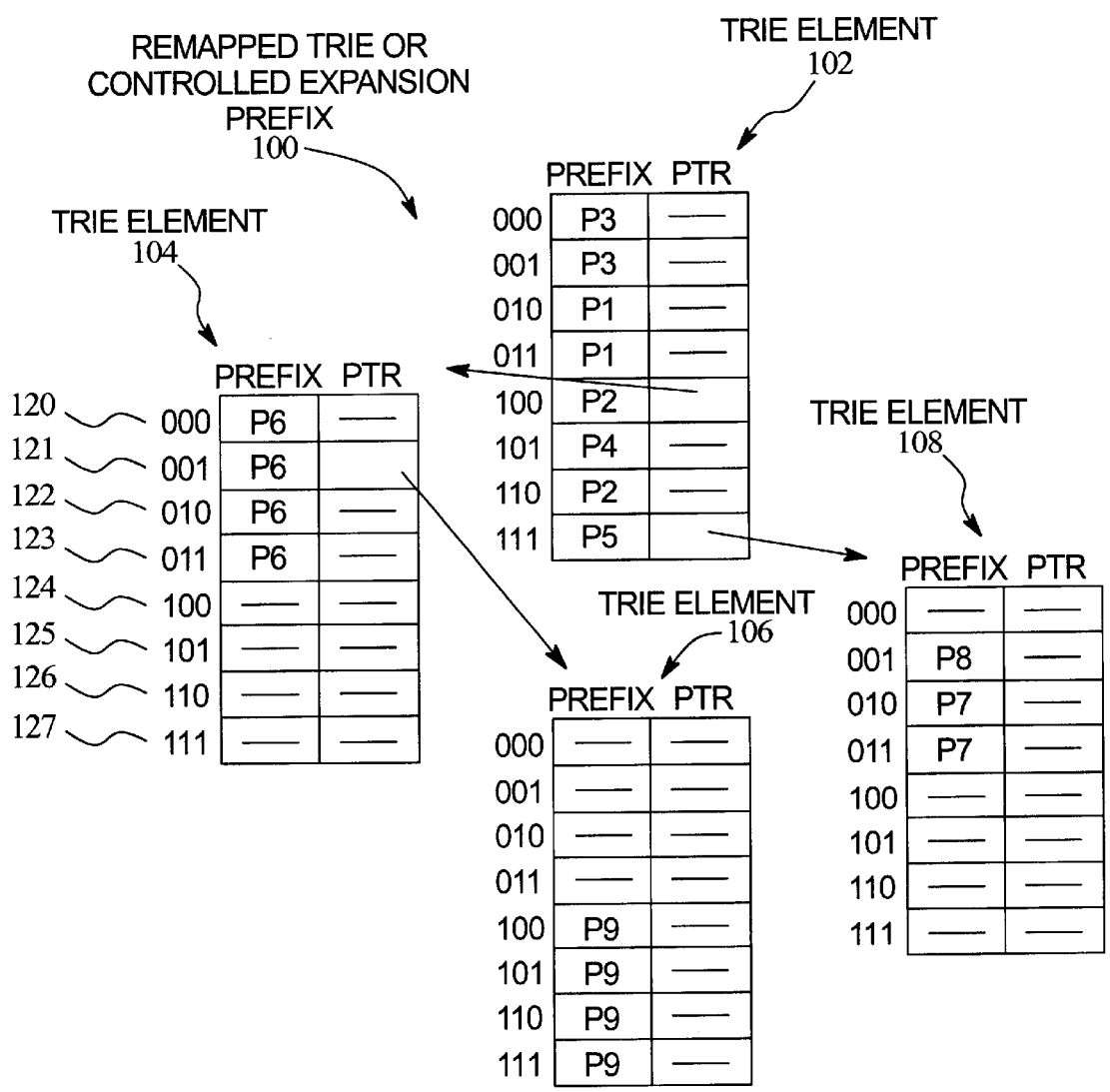
FIG. 2A is a first example of a prior art data structure illustrating controlled prefix expansion without leaf pushing.
Figure 2B:
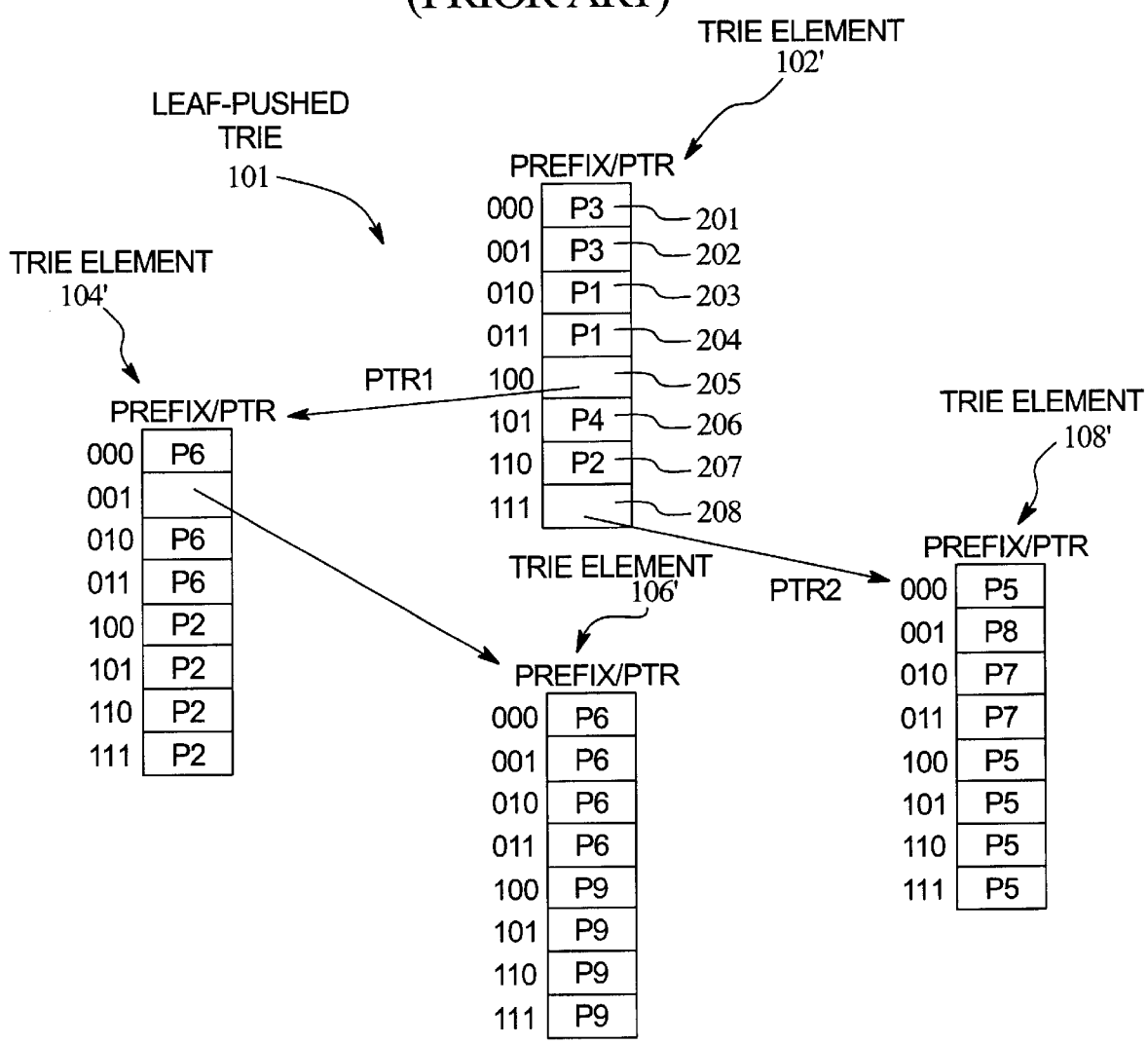
FIG. 2B is a second example of a prior art data structure illustrating controlled prefix expansion with leaf pushing.
Figure 2C:
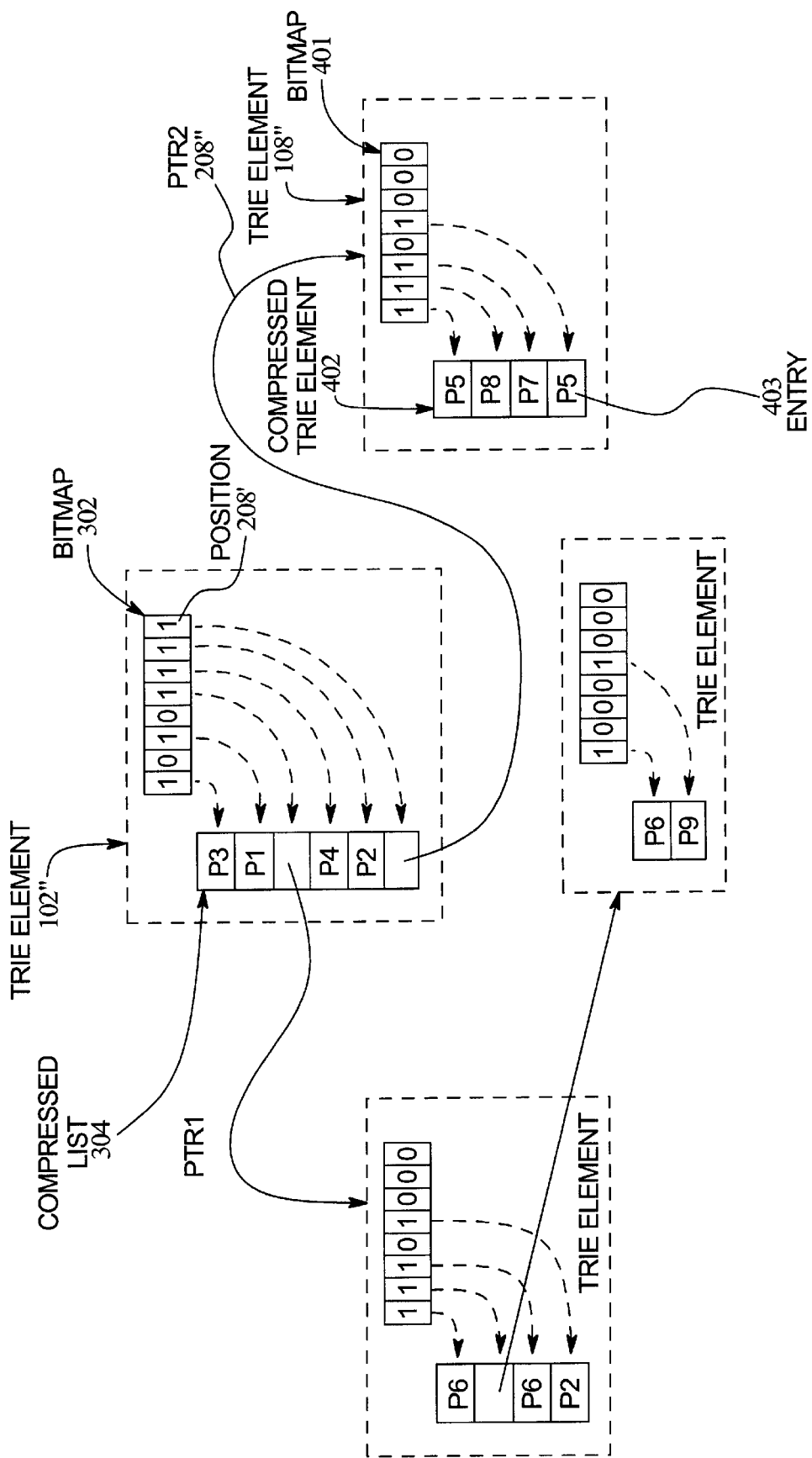
FIG. 2C is a third example of a prior art data structure illustrating a method according to the Lulea algorithm.

According to the invention, a means is provided for rapid search for the longest matching prefix from a prefix database. First, with reference to the trie 20' of FIG. 3, the trie 20 of FIG. 1 is segmented into many trie elements 50, 52, 54, 56, 58, 60, each containing one or more levels from the original trie 20 (FIG. 1). By way of example, each trie element contains at most three "tree" levels of the original trie 20. These three tree levels are grouped into multibit trie elements 50, 52, 54, 56, 58, 60. In the example shown in FIG. 1, the original trie 20 had eight tree levels, but in the segmented trie 20' there are only three multibit trie element levels (Trie Level 1, Trie Level 2, Trie Level 3). In general, the trie elements can contain from two to eight tree levels from the original trie. The number of tree levels of the original binary trie that are grouped together is called the stride of the trie. The trie element 50 in the example in FIG. 3 has a stride of three. The trie 20' is formed for example in network routing applications from the structure of a packet header and may comprise a source address, a destination address, a protocol type, a source port and a destination port, all represented in a single prefix format.

The trie elements 52, 54, 56; and 58, 60 in the lower two trie levels of the illustrated data structure are each linked to their parent trie element by a single Child Pointer 61, 62, 64 which locates all children associated with a parent. This is made possible by storing all of the parent's children in a contiguous block, herein called a Child Array 66, 68, 70. In some cases (those trie elements 54, 58, 60 containing prefix labels P4, P9, P8), there are no children. In other cases in the example there are one or more children. In general, there may be up to as many as 256 children for a stride of eight.

Figure 3:
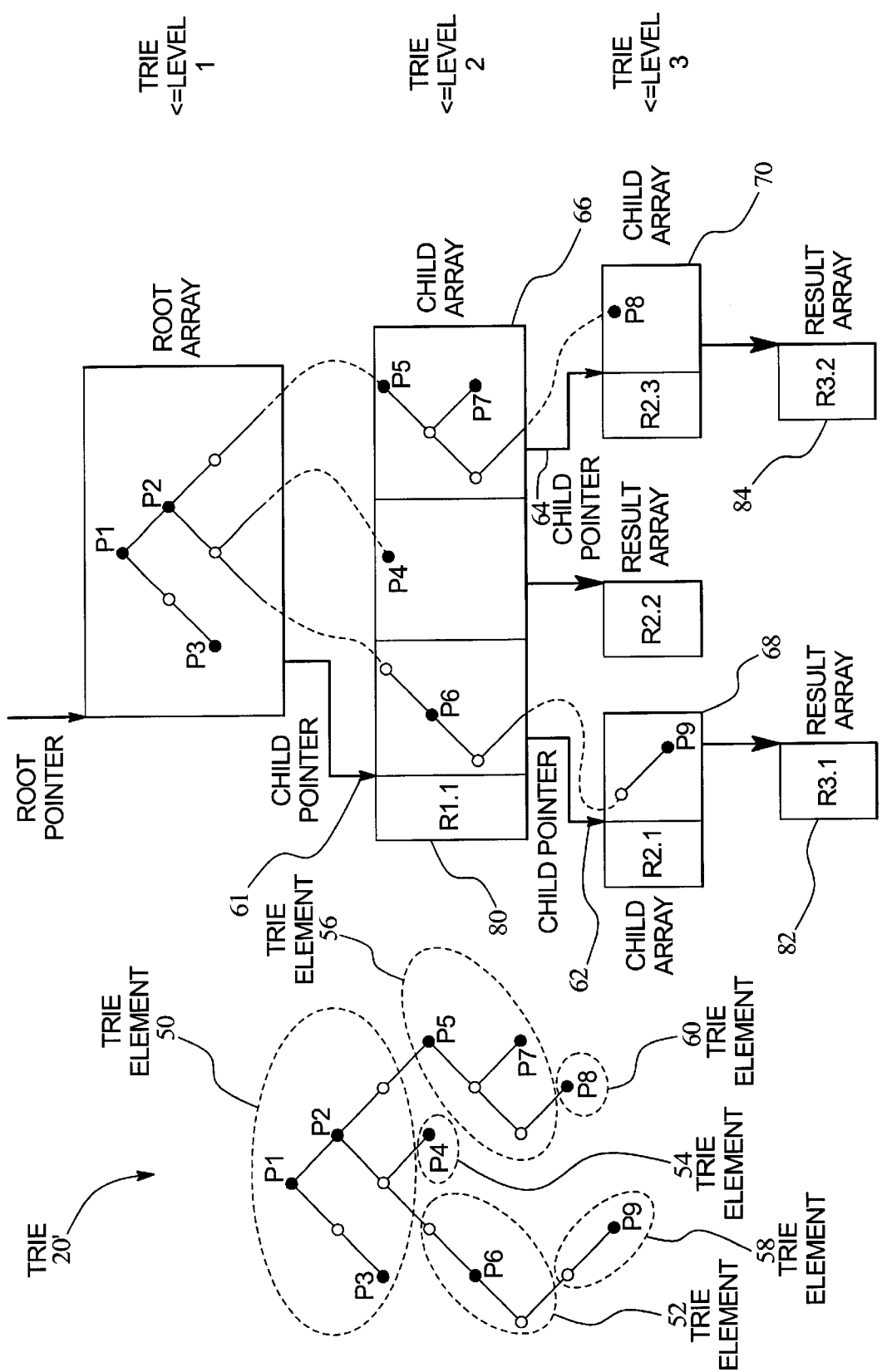
FIG. 3 is a diagram of a structured prefix-type database according to the invention showing both segmentation of the database into trie elements and the arrangement of the database into a root array and multiple levels of associated child arrays.

Thereafter, an action must be taken if a longest matching prefix is found, the action being based on the particular prefix found. In the case of packet classification the result sought is often the next hop address, but may be the disposition of the packet or some modification of the packet header. In general, the results (each being a value that indicates what action is to be taken) are also stored in the Child Array. In the example of FIG. 3, the results of a longest prefix match with any of the prefixes in the Root Array are stored in R1.1 80, a contiguous field in the array. Similarly, the consequences of a match to prefix label P9, or P8 are stored in location R3.1 82 or R3.2 84, Result Arrays that happen to have no accompanying trie elements. The location of a result (an action to be taken) can be calculated knowing the Child (or Root) Pointer and the offset of the result from the beginning of the result block, as hereinafter explained.

Figure 4:
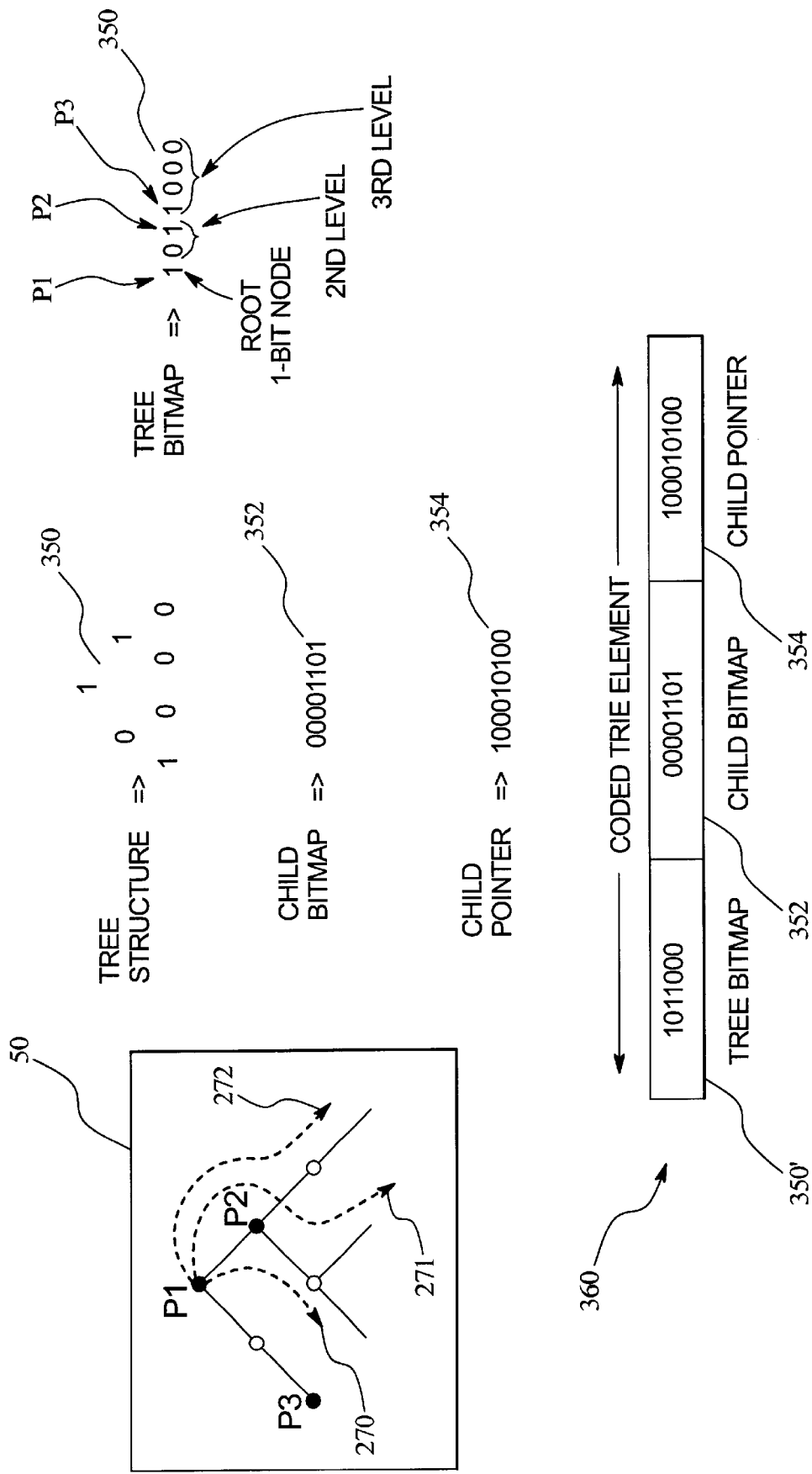
FIG. 4 is a graphical representation of the coding procedure for the representation of a tree bitmap and a child bitmap according to the invention.

Next, according to the invention, a trie element is coded into a compact bitmap as illustrated by FIG. 4 for the root trie element. Therein the root trie element 50 has the Prefix Nodes represented by 1's and has the Vacant Nodes represented by 0's. By scanning the root trie element from left to right and through successive levels from top to bottom, the tree structure 350 is created. This tree structure 350 can then be written and stored sequentially in a trie element 360 as a tree bitmap 350' as shown both at the right and bottom in FIG. 4. All trie elements 360 have a three-field structure in a database. In general, for a stride of s bits, the length of the sequentially written tree bitmap 350' is $2^s-1$ bits.

The locations of children that are linked to the parent must also be coded in the trie element 360. In the example of the root trie element 50, paths 270, 271, 272 to the children occur for target strings 100, 101 and 111. (These 3-bit binary strings correspond to the decimal numbers 4, 5 and 7.) Numbering the bits in the child bitmap 352 from left to right as 01234567, the children are represented by 1's in the positions 4, 5 and 7, i.e., 00001101. In the general case, for a stride of s bits, the length of the child bitmap is $2^s$ bits.

Finally, the child pointer 354 must be coded into the trie element 360. Assume b is the number of bits required in the child pointer 354. The storage for each trie element 360 is $b-1+2^{(s+1)}$ bits. In the example shown in FIG. 4 a Child Pointer 100010100 of 9 bits is assumed for a total of 7+8+9=24 bits for the entire trie element.

It is desirable to have each trie element stored in a fixed number of bytes.

This will be the case for a fixed stride and fixed size child pointer. However, the results (i.e., actions to be taken) also need to be stored adjacent to a block of child Child Elements. For memory management purposes, such results are placed in one or more storage units whose size is equal to that of a trie element. Assume that n results can fit into a single storage unit of memory, where n depends upon the size of a result field.

Required Computations

After a trie element has been retrieved from memory there are several required computations in order to proceed along the search path to subsequent trie elements. The first is indicated in Table 1 where the first stride of the target string is assumed to be 100 (binary). Tree Level 0 (FIG. 1) can match any string independent of the target string; thus an empty target string is shown in Line 1 of Table 1 for this column. For Tree Level 1 only the first bit of the target string needs to match; thus, an initial 1 is shown. Similarly, for Tree Level 2 and the Child Bitmap, the first two and three bits of the target string are shown, respectively.

TABLE 1

| Example for Stride s = 3 | | Tree Bitmap Tree Level 0 | Tree Bitmap Tree Level 1 | Tree Bitmap Tree Level 2 | Child Bitmap |
|---|---|---|---|---|---|
| 1 | Binary Coded Target String | | 1 | 10 | 100 |
| 2 | Unary Coded Target String | 1 | 01 | 0010 | 00001000 |
| 3 | Example Bitmap | 1 | 01 | 1000 | 00001101 |
| 4 | Bit-by-bit AND | 1 | 01 | 0000 Longest Match Exists | 00001000 Child Element Exists |

In Line 2, these binary coded strings are transformed into unary coded strings. For example, in the entry for the child bitmap the binary coded string in Line 1 represents the integer four. The unary coded version in Line 2 numbers the bits from left to right 01234567, sets the bit numbered four to 1 and then sets the remaining bits to 0 resulting in the code 00001000. In Line 3 the tree structure 350 in FIG. 4 is shown in the first three columns, and the child bitmap 352 is shown in the last column. Taking the bit-by-bit AND of Lines 2 and 3 produces Line 4, in which the 1's indicate where there are matches. From this result can be determined if and at what level the longest match exists and if a child trie element exists.

Figure 5:
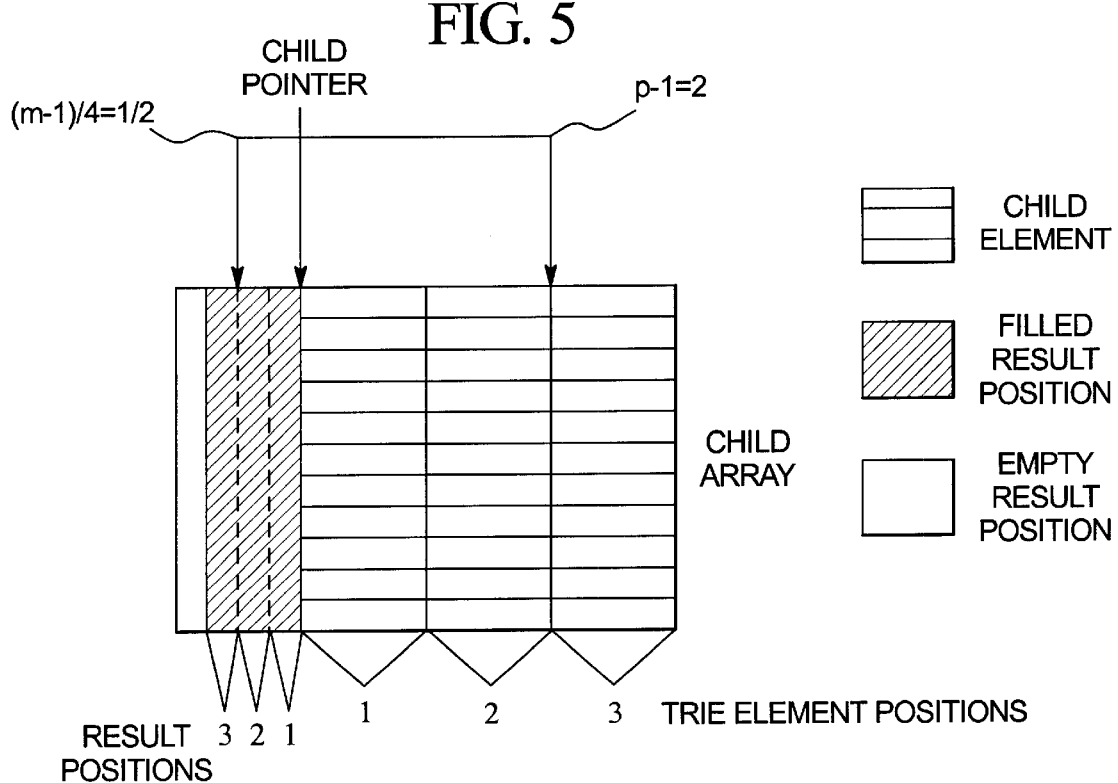
FIG. 5 is a graphical representation of a child array showing memory addressing calculations.

The second step in the required computations is shown in Table 2. Line 1 corresponds to Line 3 in Table 1 except that all the tree levels are merged into a single tree bitmap 350'. In Line 2 each bit that is a 1 in Line 4 of Table 1 is extended all the way to the left, i.e., to the limit of the size of the field. As a result the Extended AND is all 1's to the left of and including the longest match bit and is all 0's thereafter. A similar extension is applied to Line 4 of the child bitmap. Taking the bit-by-bit AND of the first two lines produces the Offset Maps of Line 3 of Table 2. Here it is only necessary to count the number of 1's to get the Match Offset m and the Path Offset p. Match Offset m is the number of 1's in the tree bitmap up to and including the longest prefix match to that point in the search path. The Path Offset p is the number of 1's in the child bitmap up to and including the one that connects to the next child in the search path. One alternative for the structure of the complete Child Array, is shown in FIG. 5. (A Child Element is a trie element in the Child Array.) Along with m and p, this leads to the calculation of the offset from the Child Pointer needed to access the Result Element ([m−1]/n storage units to the left) and the Child Element (p−1 units to the right). Although the next Child Element must be fetched at each level of the search, a Result Element need not be fetched from memory until the search ends.

TABLE 2

| | Example for Stride s = 3 | Tree Bitmap | Child Bitmap |
|---|---|---|---|
| 1 | Example Bitmap | 1011000 | 00001101 |
| 2 | Extended AND | 1110000 | 11111000 |
| 3 | Offset maps | 1010000 Match Offset m = 2 | 00001000 Path Offset p = 1 |

The memory address calculations in the Child Array are shown by an example in FIG. 5. Here a Path Offset of p=3 points to the beginning of the third Child Element. In order for a Path Offset of p=1 to point to the beginning of the first Child Element, 1 must be subtracted from p. For n=4 (four results packed into the storage unit) the third result begins at ½ storage unit from the Child Pointer's destination. If there were five results in the Child Array, a second Result Element is required even though some of its positions must remain empty.

Architecture for the Required Computations

Figure 6:
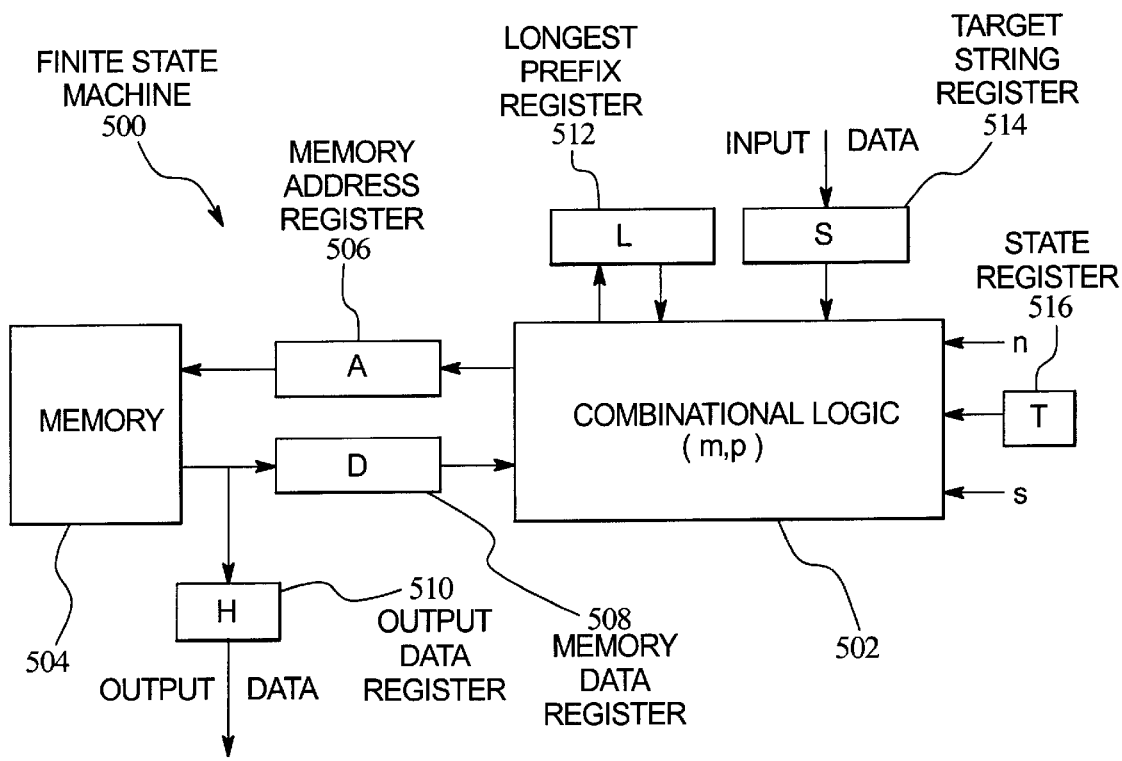
FIG. 6 is a block diagram of a Finite State Machine for implementing the inventive method.

The computations described in Tables 1 and 2 are carried out in a Finite State Machine (FSM) 500 and its associated combinational logic 502 shown in FIG. 6. The Root Element and the Child Arrays including the results are all stored in the Memory 504. The other components are flip-flop registers, including a memory address register 506, a memory data register 508, and an output data register 510. The output data register holds the output data, typically the next hop address derived from packet classification. Further there is a longest prefix register 512 for holding the longest-prefix-match pointer identified so far and a target string register 514 which is a shift register for holding the input target string shifted so as to present the current stride to the Combinational Logic. T 516 is a register that determines which of four states the FSM is in at the current time.

The Combinational Logic 502 is based on a fixed stride s and produces the logic signals m and p shown in the last line of Table 2, where m is the Result Element Offset, p is the Child Element Offset. The technique for actual computation of the parameters m and p will be explained hereinafter.

Flow Chart Description of the Operation of the Finite State Machine

Figure 7:
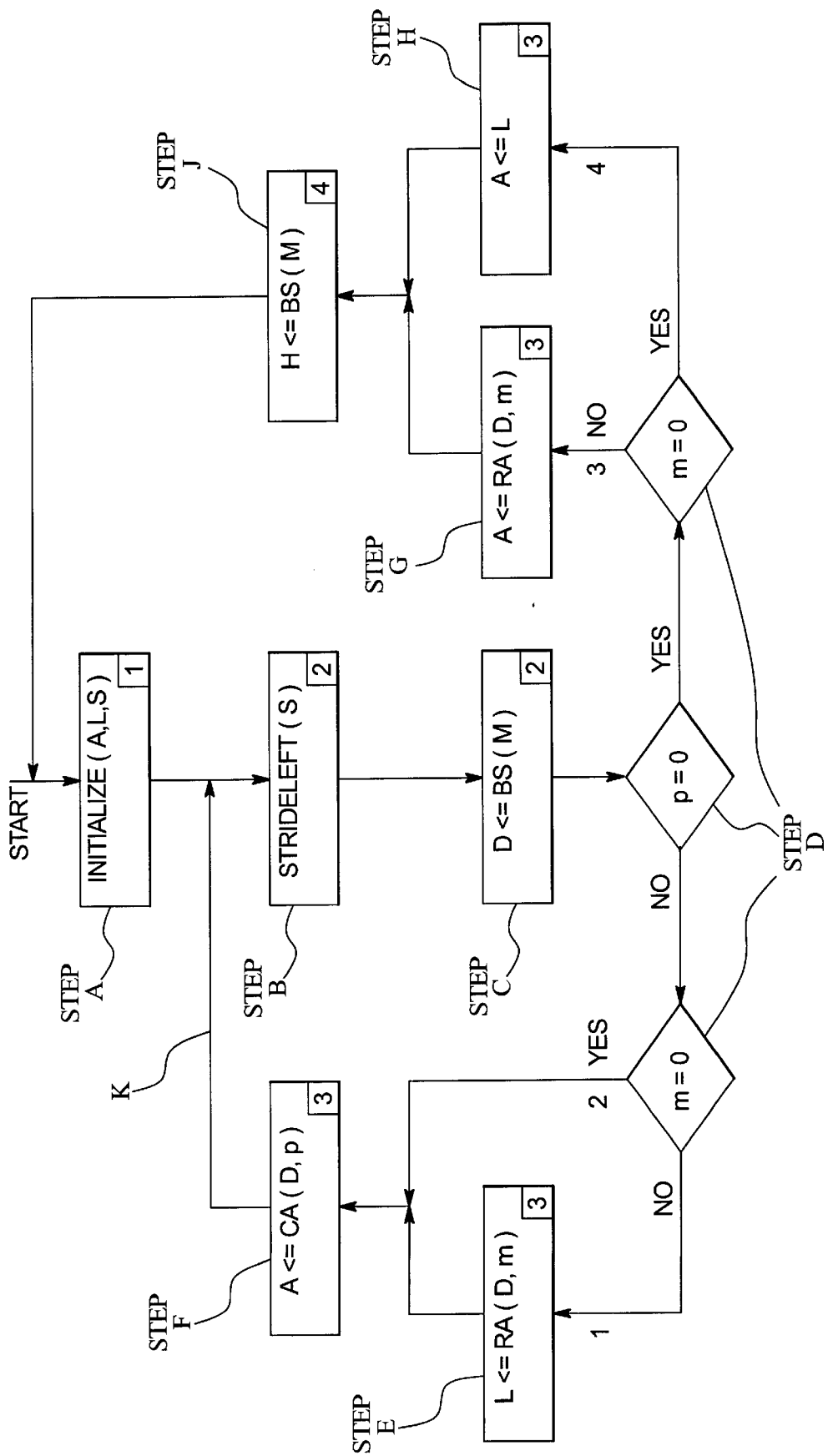
FIG. 7 is a flow chart of the method of the operation of the Finite State Machine according to the invention.

As can be seen in FIG. 7, the Finite State Machine (FSM) first initializes the memory address register A to the Root Element pointer, clears the last longest-prefix-match pointer register L and loads the target string register S (Step A). All these actions can be carried out concurrently in state T=1. The StrideLeft action shifts the contents of S, s bits to the left, so that after Step B the first stride of the target string is in position to be analyzed by the Combinational Logic. Concurrently also in state T=2, the memory fetches the Root Element data (BS=barrel shifted memory fetch) and deposits the data in the Data Register D (Step C). There is a Barrel Shifter on the memory output so that data can be aligned properly for non-integer memory addresses. This is used for fetching results, as will be seen later.

After the data representing the Root Element appears in D, all information needed by the Combinational Logic is available, and the following decisions based on the values of m and p can be made while in state T=2 (Step D) There are four cases (labeled by paths 1, 2, 3, 4):

1) m>0; p>0: There is a match and a path to a Child Element.
2) m=0; p>0: There is no match, but there is a path to a Child Element.
3) m>0; p=0: There is a match, but there is no path to a Child Element.
4) m=0; p=0: There is no match and no path to a Child Element.

Analyzing these cases from left to right in the flow chart of FIG. 7 produces the following actions in state T=3:

1) Load the Result Address RA(A,m) into L based on the Child Pointer in D and the Match Offset m (Step E). Also, concurrently, load the Child Address CA(D,p) into memory address register A based on the Child Pointer in D and the Path Offset p (Step F). These two steps, both taken in state T=3, save the longest match found in the current trie element in the L register and load the address of the next trie element to be searched into the memory address register A.

2) Since there is no match in this case it is only necessary to load the memory address register A (Step F) as in 1).
3) There is a match, but no child exists, so the Result Address RA(D,m) is loaded into the memory address register A (Step G). In state T=4 the result value in memory address register A (with a possible barrel shift) is fetched and loaded into the H register (Step J).
4) In this last case there is neither a match nor a child, so the longest match stored in L is loaded into the memory address register A (Step H). As in path 3) the resultant value of the subsequent memory access is loaded into the H resister (Step J).

For the paths 1 and 2, no result has been obtained so the target string must be searched at the next level (Step K). The S register is shifted left a stride to expose the next s bits of the target string (Step B) and the process is repeated at the next trie level. For paths 3 and 4, a result has been obtained, so the FSM 500 is re-initialized and loaded with the next target string in preparation for starting a new search at the Root Element (Step A).

Combinational Logic Design

Figure 8:
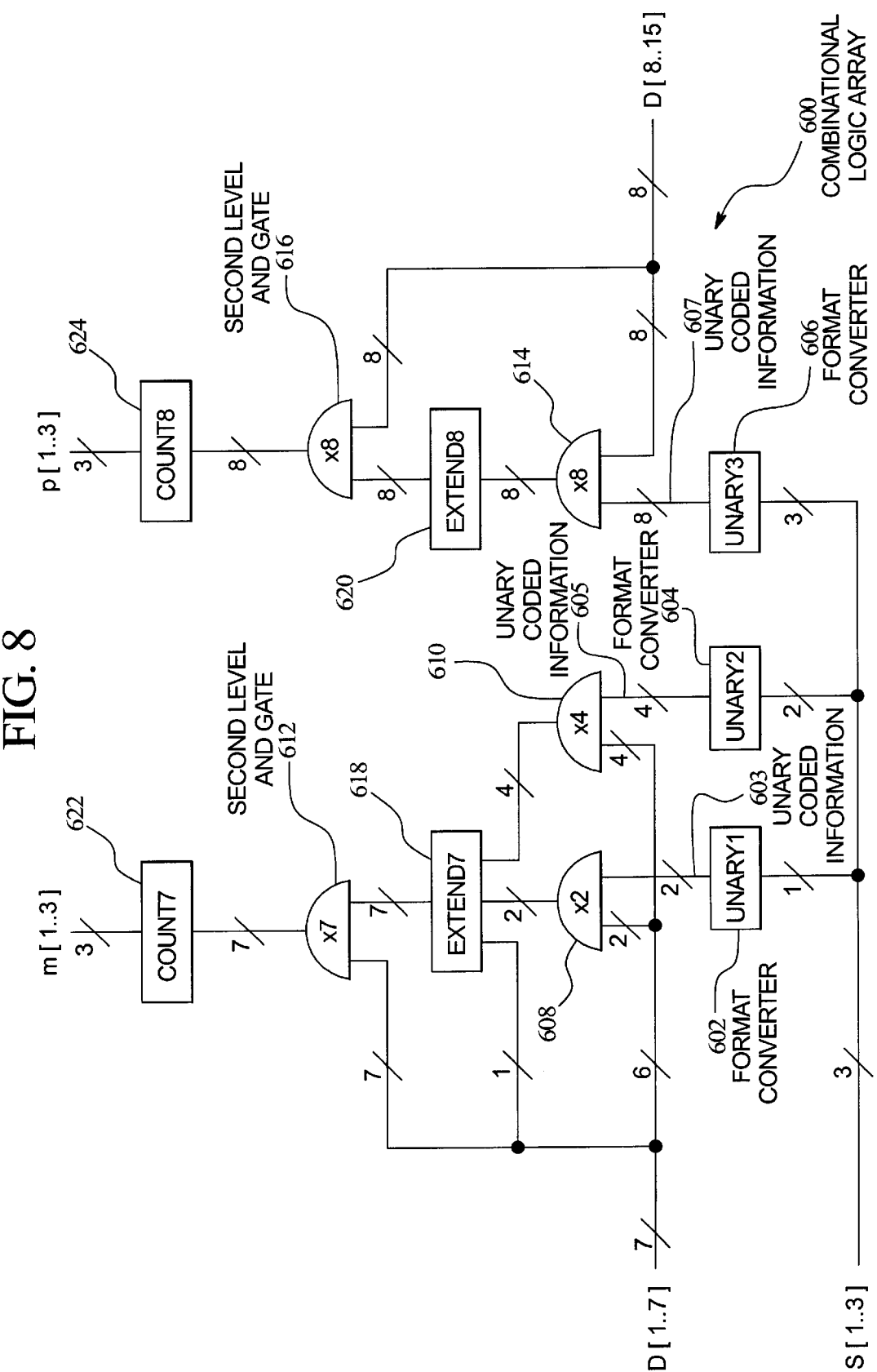
FIG. 8 is a block diagram of a combinational logic device for rapid computation of parameters used in the Finite State Machine.

FIG. 8 shows a Combinational Logic array 600 capable of calculating m and p from the current stride of the target string S and the contents of the Data Register D 508. The blocks labeled Unary1 602, Unary2 604 and Unary3 606 are format converters that take binary coded information as inputs and produce unary coded information as outputs. This is illustrated on Line 2 of Table 1 where the outputs 603, 605, 607 in FIG. 8 correspond to the entries for Tree Level 1, Tree Level 2 and the Child Bitmap, respectively. These converters can be implemented with a single level of AND gates. The units labeled with x2 608, x4 610, x7 612 and x8 614, 616 are multiple AND gates. The units in the bottom row 608, 610, 614 carry out the bit-by-bit AND function shown in Line 4 of Table 1. The Extend7 and Extend8 blocks 618, 620 extend 1's from right to left in the bit-by-bit AND result in the manner shown in Line 2 of Table 2. Again these blocks can be implemented with a single level of gates, but in this case they are OR gates.

The second level AND gates (x7 612 and x8 616) carry out a bit-by-bit AND yielding the Offset Maps in Line 3 of Table 2. The only step that remains is to count the 1's in the Offset Maps yielding m with the Count7 block 622 and p with the Count8 block 624. This step can be accomplished by a table lookup using techniques familiar in the implementation of Programmed Logic Arrays (PLAs). Both these steps can be augmented for large strides by multiple PLAs and an adder tree.

The remaining logic is familiar to those skilled in the art. For example the Child Pointer calculation requires a simple adder. The Result Address calculation requires an adder and a shift provided that n is limited to powers of 2. The S register 514 must be a shift register and the memory output logic must include a Barrel Shifter.

The Combinational Logic described in FIG. 8 is just one example of the realization of the required functions. Other embodiments could also achieve the desired result, but the one shown has a good balance of speed and simplicity. At the cost of additional logic complexity, faster designs are possible. Likewise, at the cost of slower operation, designs with less logic complexity are possible.

Optimizations, Ramifications and Conclusions

The specific embodiment described hereinabove is one of many alternative designs for rapid prefix matching that employ the Tree Bitmap concept. It is, however, an excellent balance between simplicity and speed. Some of the other alternatives are described briefly below and others, in addition, can be easily developed by one of ordinary skill in the area of digital system design who follows the teachings of the previous section.

Other strides: The example shown above utilizes a stride of s=3. Other strides, both smaller and larger, can be used. The most practical values are in the range from s=2 to s=8. Given a prefix database of up to 500,000 prefixes, the Child Address pointer would have to contain 19 bits. Current databases are an order of magnitude smaller and could be implemented with a pointer of only 16 bits, but it is clear that the prefix dabase size will grow substantially within the next few years. For the various strides in this range and with a 19-bit pointer, the size of a trie element is shown below in the second column of Table 3.

TABLE 3

| Stride (bits) | Element Size (bits) | Normalized Memory Bandwidth | Normalized Search Time | Bandwidth SearchTime Product |
|---|---|---|---|---|
| 2 | 26 | 1.00 | 1.00 | 1.00 |
| 3 | 34 | 0.87 | 0.67 | 0.58 |
| 4 | 50 | 0.96 | 0.50 | 0.48 |
| 5 | 82 | 1.26 | 0.40 | 0.50 |
| 6 | 146 | 1.87 | 0.33 | 0.62 |
| 7 | 274 | 3.01 | 0.29 | 0.87 |
| 8 | 530 | 5.10 | 0.25 | 1.28 |

As the stride increases, the memory bandwidth required first decreases slightly and then increases. Also as stride increases the number of memory accesses needed to examine all prefixes in a search path decreases as does the time required for a complete search. The Bandwidth-SearchTime product is minimized for strides between 3 and 6, However, other considerations such as advanced memory technology may strides outside this range.

Mixed memory technology: It may be desirable to mix on-chip SRAM with off-chip DRAM in longest prefix matching systems. The on-chip SRAM is fast but expensive. The off-chip DRAM is slower but less expensive. By combining these two technologies and taking advantage of a storage structure and stride appropriate for each technology, it is possible to gain the advantages of both. One technique for accomplishing this combination is through use of a pipelined architecture with the first strides accomplished through on-chip SRAM in the first stage of processing, the next strides acoonmplished through off-chip DRAM in the next stage of processing and any remaining very long fixes searched through on-chip SRAM in the final stage of processing. Each processing stage should have the storage structure, the number of bits in the stride and number of strides in the stage optimized for search speed and storage capacity.

Figure 9:
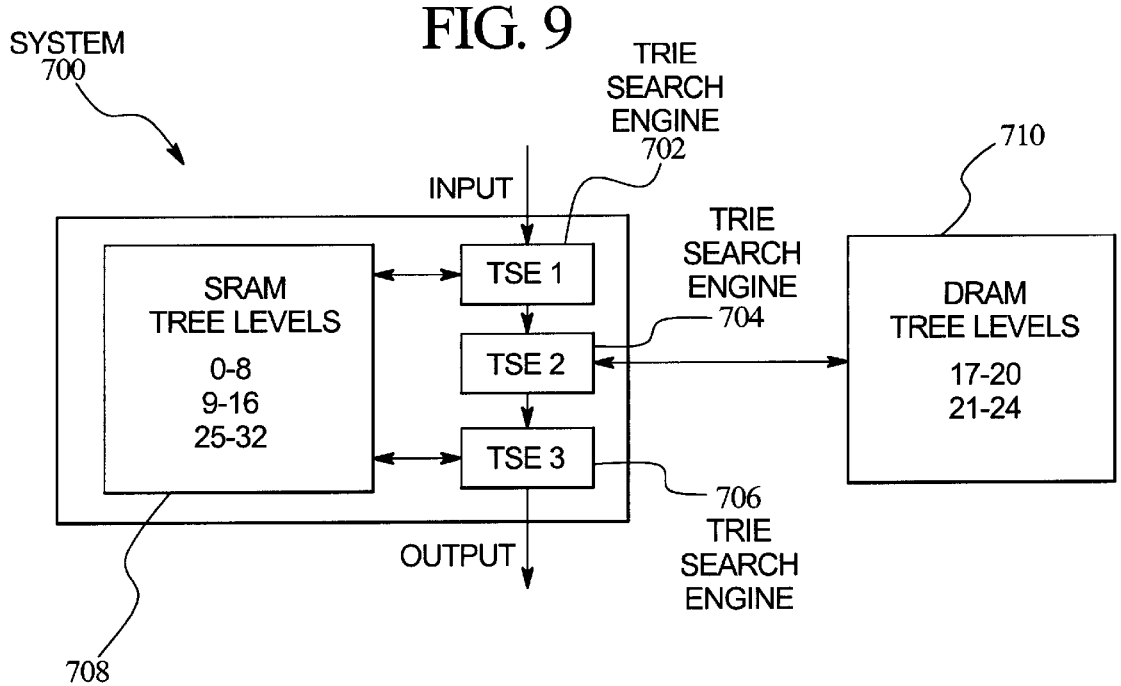
FIG. 9 is a block diagram of SRAM and DRAM memory organization according to the invention.

In FIG. 9 a block diagram of a system 700 is shown with two 8-bit strides processed by Trie Search Engine 1 (TSE 1) 702, two 4-bit strides processed by TSE 2 704 and the final 8-bit stride processed by TSE 3 706. Each TSE contains the registers and the Combinational Logic of the FSM 500. The speed of SRAM 708 is an order of magnitude faster than that of DRAM 710 and can service both TSE 1 702 and TSE 3 706 concurrently. DRAM is an order of magnitude cheaper and can handle the Tree Levels that have the largest number of prefixes. In fact, in the MAE East database, these two 4-bit strides occupy an order of magnitude more storage than all the rest of the trie data structure. The pipeline cycle time is determined primarily by the DRAM cycle time. By arranging this external memory in two banks, one for each of the two external strides, the pipeline cycle time is equal to the memory cycle time and influenced minimally by the time taken for other processing steps.

Figure 10A:
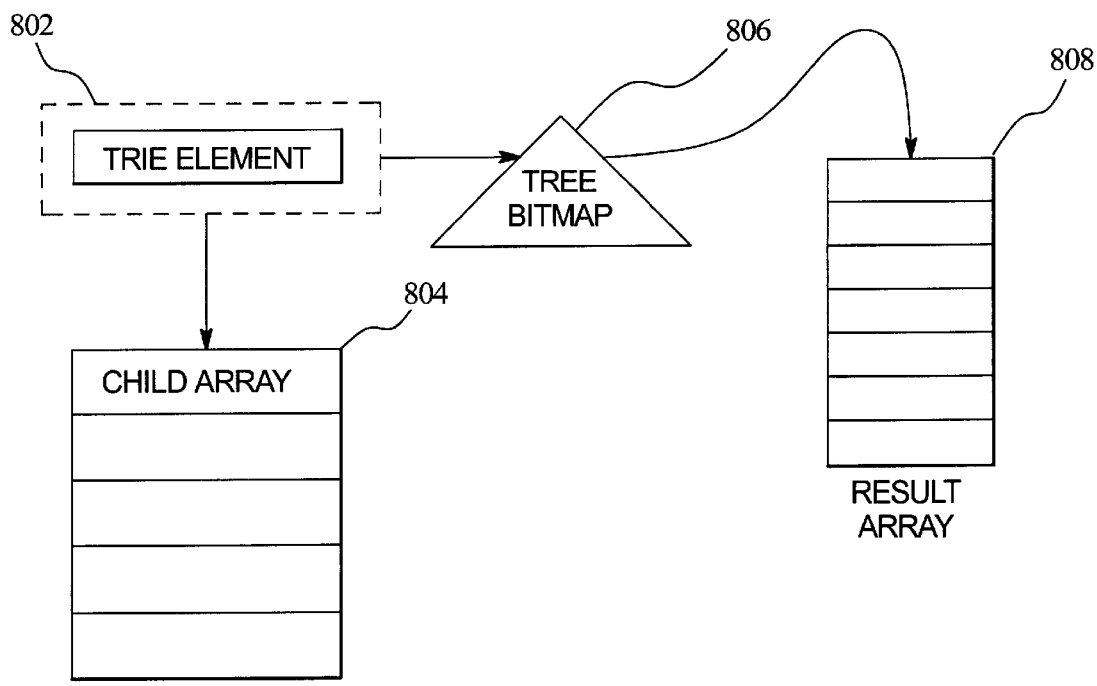
FIG. 10A is a block diagram of a split tree bitmap according to one alternative.
Figure 10B:
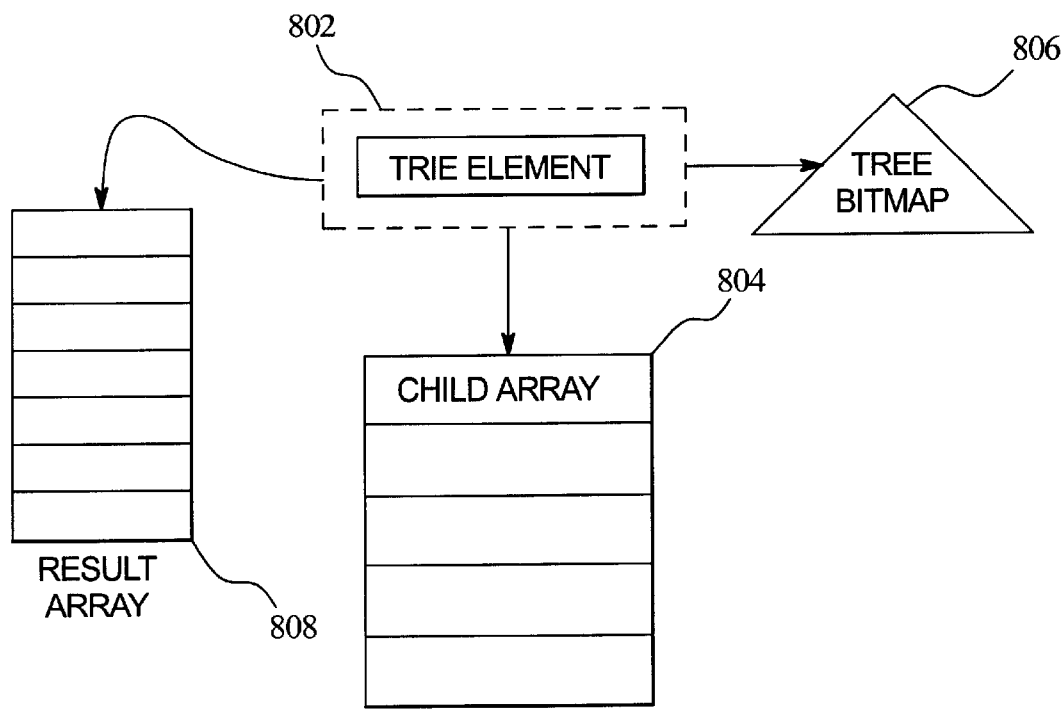
FIG. 10B is a block diagram of a split tree bitmap according to another alternative.

Split Tree Bitmaps: Reducing memory bandwidth while keeping the stride constant is possible by storing separately the Tree and Child Bitmaps and thereby reducing the size of each random memory access. FIG. 10A shows one alternative and FIG. 10B shows another alternative for implementing a split tree bitmap when memory segmentation is required. In each instance, only the Child Bitmap is placed within each trie element 802. If there is no memory segmentation, the Tree and Child Bitmaps from the same parent can be placed contiguously in memory. If the memory organization requires segmentation, it is unwise to have the Bitmaps scattered across multiple memory banks. One option in this case is to have the trie element 802 point at the Tree Bitmap 806, and the Tree Bitmap 806 point at the Result Array 808 (FIG. 10A). Alternatively, the trie element 802 can have three pointers: to the Child Array 804, to the Tree Bitmap 806, and to the Result Array 808 (FIG. 10B).

For split tree bitmaps to function properly, each child must have a bit indicating if the Tree Bitmap associated with its parent contains a prefix that is a longest match so far. If there was a prefix in the path, the FSM records the location of the Tree Bitmap containing the longest matching prefix thus far. This location is known from the data structure of the last trie element. When the search terminates, the FSM must access the corresponding Tree Bitmap and Result Array. Notice that the first described algorithm accesses the result information only when actually needed; the split tree algorithm accesses even the Tree Bitmap only when needed. This is possible because any time a prefix P is stored in a trie element X, all children of X that match P can store a bit noting that the parent has a stored prefix on the search path.

The split tree algorithm requires some added complexity in the FSM in order to defer access to the Tree Bitmap until the search terminates, but can be accomplished with only minor modifications of the flow chart of FIG. 7. Those skilled in the art would be able to make this modification based on the foregoing explanation. An important benefit of split tree bitmaps is that if an element contains only paths and no prefixes, a null pointer to the Tree Bitmap can be used and no space will be wasted on the Tree Bitmap itself.

Figure 11:
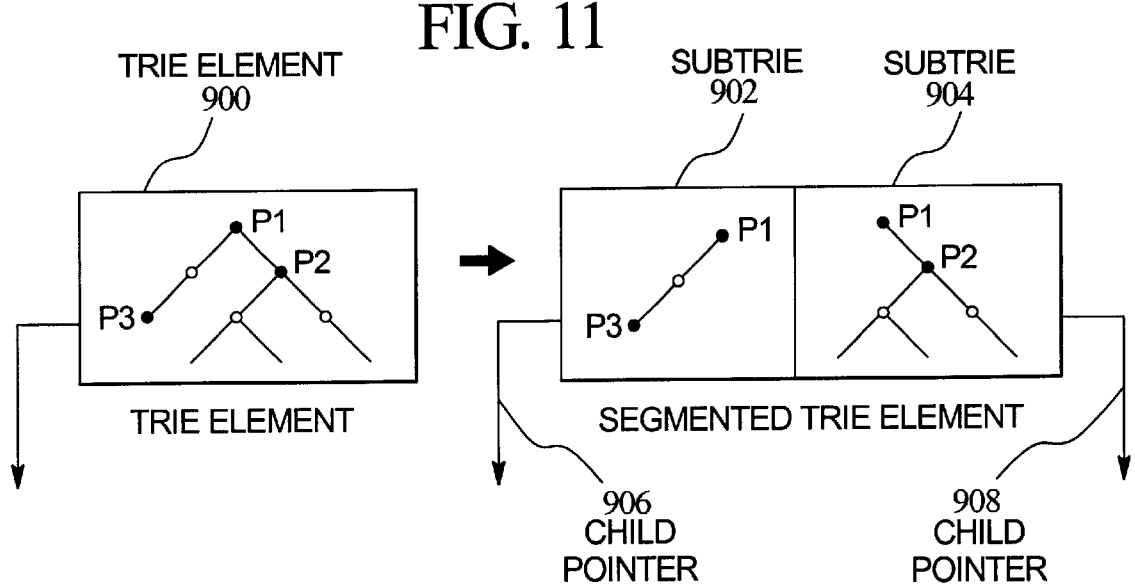
FIG. 11 is an illustration of a segmented bitmap.

Segmented Bitmaps: After splitting the Tree and Child Bitmaps into separate parts, the size of the trie elements may still be too large for the optimal burst size associated with the system memory. The next step for reducing the element size is to segment the trie element itself The goal behind segmented bitmaps is to maintain the desired stride while keeping the storage space per trie element constant, but reducing the memory data path width. The simplest case of segmented bitmaps is shown in FIG. 11 with a stride of 3. The trie element 900 is segmented into two subtries 902, 904, and the initial root node P1 is duplicated in both subtries. Since the possible nodes in each segmented trie 902, 904 are half those possible in the original 900, the bitmap for each segmented trie is half the length (with one more bit for the duplicated root). Each segmented trie 902, 904 is also given its own Child Pointer 906, 908 as well as its own Child Bitmap, and each is stored separately. Thus, each trie element contains two contiguously stored segments.

Because each segment of a trie element has its own pointers, the children and result pointers of other segmented trie elements are independent. Since the segments are stored contiguously, the high order bits (of the bits that would normally have been used to access the trie element) can be used to access only the required segment. Thus roughly only half the bitmap size needs to be accessed. For example, using 8-bit strides, this could reduce the bit map accessed from 256 bits to 128 bits.

Content Addressable Memory (CAM) Elements: Empirical results show that a significant number of trie elements contain only a few prefixes. In these cases the space normally occupied by a Tree Bitmap, a Child Bitmap and a pointer to a Child Array or Result Array can be replaced by a number of entries that implement a content addressing function either in software or hardware. There are well known algorithms to accomplish this since it corresponds to searching a list of prefix fragments for a match to the bits in the current stride of the target string. Commercial hardware technology is available that also has this functionality (see for example: "What is a CAM (Content Addressable Memory)?" Application Brief AB-N6, MUSIC Corporation, Hackettstown, N.J., (presented as a tutorial at http://www.music-ic.com/). Which elements of the trie data structure should be replaced by CAM elements is determined primarily by the storage saved by the replacement and can be determined empirically. Generally, elements with very few prefixes or children are candidates to be replaced by a CAM element, but as the number of prefixes or children grows diminishing returns are quickly reached.

Multi-Field Packet Classification: The direction of state-of-the-art router technology is toward packet handling functions that require header information that is increasingly deep within a packet. Thus, the direction is to move beyond looking up the destination address (Layer 2) toward more general packet classification (Layers 3 and 4) which is required by multicast, tunnels, virtual private networks (VPNs), QoS support and security filters.

The relevant information is contained in a series of header fields 946 (FIG. 12A). For example, in IPv4 (Internet Protocol, version 4) a packet header could be described as containing the five fields Destination Address (DA), Source Address (SA), Protocol Field (P), Destination Port (DP) and Source Port (SP). The rules for classifying a message are encapsulated in data structures called filters 950–998 (FIG. 12A) in the table 948. In multi-field packet classification, for each incoming message, the router will be required to go beyond the longest matching prefix of a Destination Address (950–958) to a determination of the lowest cost matching filter that takes into account information in multiple header fields. Filters can require exact matches (e.g. 958, 960, 968–988), prefix matches (950–956, 962–966), and range matches (990) and combinations of the above (992–998). Filters can be assigned a cost by the network administrator that allows for the identification of a single, least-cost, matching filter. In the example shown in FIG. 12A cost is indicated by the filter's hierarchy of location in the table 948 with greatest cost at the top and least cost at the bottom.

The most common type of filter can be reformatted and recognized as either an exact match or a single prefix match (950–988). The remaining filters (990–998) are small in number and can be handled by CAM techniques that execute concurrently with the Tree Bitmap method or with any other implementation of a prefix search.

The Tree Bitmap method described hereinabove is the preferred implementation of a prefix search. It can be used to classify packets by applying filters based on information from the five header fields mentioned above. The method is to create a larger trie that contains a compact representation of these filters, but is still in either exact match or prefix match form and then use the process described hereinabove.

Figure 12B:
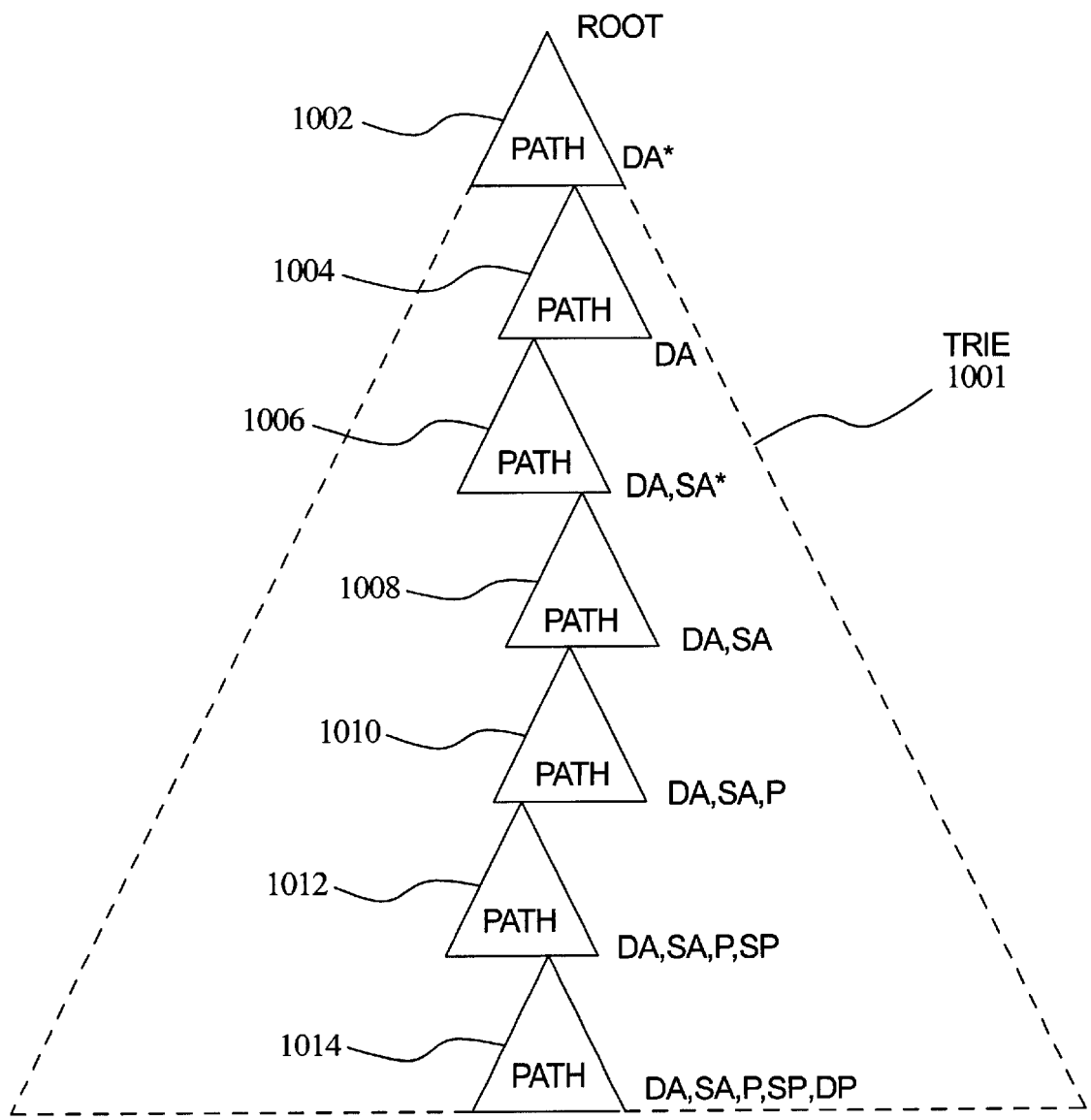
FIG. 12B is a diagram of an example of multi-field packet classification using a longest matching prefix search.

An example of how this method can be applied is shown schematically in FIG. 12B where a series of filters span the range from prefix matches on a Destination Address to exact matches on all five fields. The typical application of the various filters shown in FIG. 12B is as follows:

| | |
|---|---|
| DA* | Unicast destination prefix, 950–958 |
| DA | Core-based tree multicast groups, 960 |
| DA,SA* | Source-based tree multicast groups, 962–968 |
| DA,SA | VPNs (virtual private networks) and tunnels, 970–978 |
| DA,SA,P | Protocol tunnels, 980–988 |
| DA,SA,P,SP | Service tunnels, 980–988 |
| DA,SA,P,SP,DP | End-to-end flows, 980–988 |

In FIG. 12B the dashed triangle represents the entire trie, whereas the smaller triangles 1002–1014 suggest the path taken by a search through the various filters embedded in the trie. Thus, either a single prefix match or an exact match is sufficient to implement most of the filters required to provide multi-field classification used in routers.

In conclusion, the data structure and search method of this invention provides for the rapid search of a database for the longest prefix match. The method is well suited to implementation in computer hardware, provides a compact storage structure, is scalable to large databases and can be applied to a pressing problem in the design of Internet multiservice routers.

There are a number of optimizations and ramifications suitable for adjusting the preferred embodiment to various specialized needs. Although the descriptions above contain many specific details, they should not be construed as limiting the scope of the invention, but merely providing illustrations of some of the presently preferred embodiments of this invention. Thus the scope of the invention should be determined by the appended claims rather than the example given.

What is claimed is:

1. A computer-readable medium having stored thereon a data structure for identifying prefixes based on a trie representation of said prefixes, the trie representation being grouped in to strides of a number of tree levels greater than one, the data structure comprising:
   a first level trie element; and
   a second level trie element;
   wherein each of the first and second level trie elements includes:
      a first code field for storing a first code representing each of a plurality of nodes within a corresponding stride of said each of the first and second level trie elements, the first code identifying each of the plurality of nodes of the corresponding stride as a prefix node or a vacant node, the plurality of nodes representing multiple tree levels, a lowest-level subset of the plurality of nodes corresponding to a lowest level of said tree levels in the corresponding stride, the lowest-level subset including a plurality of said plurality of nodes;
      a second code field for storing a second code for identifying which trie paths emanate and which trie paths do not emanate from the lowest-level subset of the plurality of nodes; and
      a pointer field for storing a single link to a next level trie element;
   wherein the next level trie element of the first level trie element is the second level trie element.

2. The data structure of claim 1, wherein said prefixes correspond to information for controlling routing of packet data.

3. The data structure of claim 2, wherein said prefixes are derived to match lookup data derived from packet headers, said packet headers including one or more fields from the set of: source address, destination address, protocol type, source port, and destination port.

4. The data structure of claim 1, further comprising one or more additional second level trie elements, each containing said first code, said second code and said pointer; and
   wherein the second level trie element and said one or more additional second level trie elements are stored in a single contiguous block of memory in the computer-readable medium.

5. The data structure of claim 1, further comprising a result array corresponding to the first level trie element;
   wherein the result array is stored separately, but contiguous with the second level trie element.

6. The data structure of claim 5, wherein the first code of the first level trie element includes a tree bitmap, and said result array is indirectly accessed based on the tree bitmap.

7. The data structure of claim 5, wherein the result array and the second level trie element are each accessed by the single link stored in the pointer field in the first level trie element.

8. The data structure of claim 1, wherein different random access memory types of the computer-readable medium are disposed for storing different trie level elements.

9. The data structure of claim 1, wherein each of the first and second level trie elements is split into two parts, a first part containing the first code and a second part containing the second code, and further including a second pointer for linking the second code with the first code.

10. The data structure of claim 1, wherein selected ones or all of the first and second level trie elements are segmented.

11. A method for searching through a prefix-type data structure stored in trie elements having predefined strides of size greater than one, a stride being a number of levels in a tree grouped together, the prefix structure having a first level trie element and a plurality of second level trie elements, each trie element being a description of data in one of the strides, the method comprising:
   a) providing a first code of the first level trie element, the first code representing each of a plurality of nodes within a corresponding stride of the first level trie element, the first code identifying each of the plurality of nodes of the corresponding stride as a prefix node or a vacant node, the plurality of nodes representing multiple tree levels, a lowest-level subset of the plurality of nodes corresponding to a lowest level of said tree levels in the corresponding stride, the lowest-level subset including a plurality of said plurality of nodes;
   b) providing a second code identifying which trie paths emanate and which trie paths do not emanate from the lowest-level subset of the plurality of nodes; and
   c) providing a single pointer linking the first level trie element with the plurality of second level trie elements,
   the method further comprising:
   d) examining the first code and the second code to extract parameters indicative of termination at a leaf or indicative of a second level trie element;
   e) if termination is indicated, fetching a result value;
   f) if a second level trie element is indicated, proceeding according to the corresponding pointer and parameters to an indicated child element; and
   g) repeating steps a) though f) at a next lower level until termination.

12. The method of claim 11, wherein prefixes identified by said trie elements comprise packet header information.

13. In a networking environment wherein packets comprise multiple fields in each header containing information pertinent to classifying and handling packet traffic, a method for use in networking equipment including routers for implementing packet classification filters, the method including the steps of:
   classifying each packet of said packet traffic according to predefined filters as one or more of an exact match, a prefix match and a range match by examination of said multiple fields of said header; and
   processing packet traffic that is neither exact match or prefix match by content addressable memory (CAM) techniques, said CAM techniques being executable concurrently with a prefix search.

14. The method of claim 13, wherein said prefix search comprises a tree-bitmap prefix search.

15. The method of claim 14, wherein said tree bitmap search comprises searching through a prefix-type data structure stored in trie elements having predefined strides, a stride being a number of levels in a tree accessed in a single read operation, the prefix structure having a first level trie element and at least one second level trie element, each trie element being a description of data in one of the strides, the method comprising:
   a) providing a first code of said first level trie element describing.the prefixes contained therein;
   b) providing a second code specifying paths between said first level trie element and said second level trie elements, if any; and
   c) providing a pointer for linking said first level trie element with a selected one of said second level trie elements,
the method further comprising:
   d) examining said first code and said second code to extract parameters indicative of termination at a leaf or indicative of a second level trie element;
   e) if termination is indicated, fetching a result value;
   f) if a second level trie element is indicated, proceeding according to the corresponding pointer and parameters to an indicated child element; and
   g) repeating steps a) though f) at a next lower level until termination.

16. The method of claim 14, wherein said tree bitmap prefix search comprises applying filters based on information in a destination address field, a source address field, a protocol field, a destination port field and a source port field to create a trie containing a compact representation of selected ones of the filters in exact match form and in prefix match form.

17. The data structure of claim 1, wherein the first code field is of a first fixed and predetermined size; the second code field is of a second fixed and predetermined size; and the pointer field is of a third fixed and predetermined size.

18. The data structure of claim 1, wherein the first code includes a tree bitmap including a node identifying bit for each of the plurality of nodes.

19. The data structure of claim 1, wherein said trie representation is a binary trie representation.

20. The data structure of claim 19, wherein the second code includes a child bitmap of n bits, m is the number of nodes in the lowest-level subset of the plurality of nodes, and n equals two raised to the power of m.

21. The data structure of claim 1, wherein further comprising a result array corresponding to the first level trie element;
   wherein the result array includes an entry for only said identified prefix nodes of the plurality of nodes of the first level trie element.

22. The data structure of claim 21, wherein the first code includes a tree bitmap including an identifying bit for each node of the plurality of nodes, and a position of within the tree bitmap of an identified prefix node indicates a position within the result array for the identified prefix node.

23. The data structure of claim 22, wherein the second code includes a child bitmap including a trie path identifying bit for each possible trie path that could extend from one of the plurality of nodes to a child node in a next-level stride.

24. The data structure of claim 21, wherein the entry includes an indication of one or more actions to be taken.

25. The data structure of claim 24, wherein said one or more actions to be taken include forwarding to an indicated next hop address or a modification of a header of a packet.

26. The data structure of claim 1, wherein the second code includes a child bitmap including a trie path identifying bit for each possible trie path that could extend from one of the plurality of nodes to a child node in a next-level stride.

27. A computer-readable medium having stored thereon a data structure for identifying prefixes based on a trie representation of said prefixes, the trie representation being grouped in to strides of a number of tree levels greater than one, the data structure comprising:
   a first trie element,
   a tree bitmap element;
   a result array element; and
   a child array element;
   wherein the tree bitmap element includes:
      a first code field for storing a tree bitmap representing each of a plurality of nodes within the stride corresponding to the first trie element, and the tree bitmap identifying each of the plurality of nodes as a prefix node or a vacant node, the plurality of nodes representing multiple tree levels, a lowest-level subset of the plurality of nodes corresponding to a lowest level of said tree levels in the stride corresponding to the first trie element, the lowest-level subset including a plurality of said plurality of nodes; and
      a result array pointer field for storing a result array element link to the result array element;
   wherein the first trie element includes:
      a second field for storing a child bitmap for identifying which extending trie paths exist between the lowest-level subset of the plurality of nodes and one or more strides identified in the child array element and which extending trie paths do not emanate from the lowest-level subset of the plurality of nodes;
      a tree bitmap pointer field for storing a tree bitmap element link to the tree bitmap element; and
      a child array pointer field for storing a child array link to the child array element;
   wherein the result array element is configured for storing prefix matching results corresponding to prefix nodes identified in the tree bitmap; and
   wherein the child array element is configured for storing children elements of the lowest-level subset of the plurality of nodes having an extending trie path identified in the child bitmap.

28. computer-readable medium having stored thereon a data structure for identifying prefixes based on a trie representation of said prefixes, the trie representation being grouped in to strides of a number of tree levels greater than one, the data structure comprising:

a first trie element;

a tree bitmap element;

a result array element; and a child array element;

wherein the tree bitmap element includes a tree bitmap field for storing a tree bitmap representing each of a plurality of nodes within the stride corresponding to the first trie element, and the tree bitmap identifying each of the plurality of nodes as a prefix node or a vacant node, the plurality of nodes representing multiple tree levels, a lowest-level subset of the plurality of nodes corresponding to a lowest level of said tree levels in the stride corresponding to the first trie element, the lowest-level subset including a plurality of said plurality of nodes;

wherein the first trie element includes:

a second field for storing a child bitmap for identifying which extending trie paths exist between the lowest-level subset of the plurality of nodes and one or more strides identified in the child array element and which extending trie paths do not emanate from the lowest-level subset of the plurality of nodes;

a result array pointer field for storing a result array link to the result array element; a tree bitmap pointer field for storing a tree bitmap link to the tree bitmap; and a child array pointer field for storing a child array element link to the child array element;

wherein the result array element is configured for storing prefix matching results corresponding to prefix nodes identified in the tree bitmap element; and wherein the child array element is configured for storing children elements of the lowest-level subset of the plurality of nodes having an extending trie path identified in the child bitmap.

29. A method performed using a tree data structure representing a plurality of prefixes partitioned into a plurality of strides of a number of tree levels greater than one, each of the plurality of strides represented by a tree bitmap and indications of child paths represented by a child bitmap, said method comprising:

(a) retrieving a current-level data structure element corresponding to a current-level stride, the current-level data structure element including a current-level tree bitmap, a current-level child bitmap, and a single link to a next-level data structure element; the current-level tree bitmap corresponding to a current level stride in the tree data structure, the current-level tree bitmap including a plurality of tree bitmap bits, each of the plurality of tree bitmap bits corresponding to a particular one of a plurality of nodes, the value of a bit of the plurality of tree bitmap bits indicating a corresponding node as a prefix node or a vacant node, the plurality of nodes representing multiple tree levels, a lowest-level subset of the plurality of nodes corresponding to a lowest level of said tree levels in the current level stride, the lowest-level subset including a plurality of said plurality of nodes; the current-level child bitmap corresponding to the current level stride, the current-level tree child including a plurality of child bitmap bits, each of the plurality of child bitmap bits corresponding to a particular child path of one of the lowest-level subset of the plurality of nodes, the value of a bit of the plurality of child bits indicating a presence or absence of the corresponding child path;

(b) evaluating the current-level tree bitmap against a current-level portion of a search string to determine a longest matching prefix node or a no longest prefix match, and updating an indication of the longest matching prefix node in response to said determination of the longest matching prefix node;

(c) evaluating the current-level child bitmap against the current-level portion of the search string to determine a child stride for a next-level or a no child indication;

(d) in response to said determination of the child stride, repeating steps (a), (b), and (c) with the current-level stride corresponding to the child stride with the current-level data structure for this next iteration identified based on the single link in the current iteration; and (e) in response to said determination of the no child indication, retrieving a result based on the indication of the longest matching prefix node.

30. The method of claim 29, wherein the result is retrieved from a result array.

31. The method of claim 30, wherein the indication of the longest matching prefix node includes an address or pointer to the result.

32. A computer-readable medium containing computer-executable instructions for performing steps manipulating a tree data structure representing a plurality of prefixes partitioned into a plurality of strides of a number of tree levels greater than one, each of the plurality of strides represented by a tree bitmap and indications of child paths represented by a child bitmap, said steps comprising:

(a) retrieving a current-level data structure element corresponding to a current-level stride, the current-level data structure element including a current-level tree bitmap, a current-level child bitmap, and a single link to a next-level data structure element; the current-level tree bitmap corresponding to a current level stride in the tree data structure, the current-level tree bitmap including a plurality of tree bitmap bits, each of the plurality of tree bitmap bits corresponding to a particular one of a plurality of nodes, the value of a bit of the plurality of tree bitmap bits indicating a corresponding node as a prefix node or a vacant node, the plurality of nodes representing multiple tree levels, a lowest-level subset of the plurality of nodes corresponding to a lowest level of said tree levels in the current level stride, the lowest-level subset including a plurality of said plurality of nodes; the current-level child bitmap corresponding to the current level stride, the current-level tree child including a plurality of child bitmap bits, each of the plurality of child bitmap bits corresponding to a particular child path of one of the lowest-level subset of the plurality of nodes, the value of a bit of the plurality of child bits indicating a presence or absence of the corresponding child path;

(b) evaluating the current-level tree bitmap against a current-level portion of a search string to determine a longest matching prefix node or a no longest prefix match, and updating an indication of the longest matching prefix node in response to said determination of the longest matching prefix node;

(c) evaluating the current-level child bitmap against the current-level portion of the search string to determine a child stride for a next-level or a no child indication;

(d) in response to said determination of the child stride, repeating steps (a), (b), and (c) with the current-level stride corresponding to the child stride with the current-level data structure for this next iteration identified based on the single link in the current iteration; and (e) in response to said determination of the no child indication, retrieving a result based on the indication of the longest matching prefix node.

33. The computer-readable medium of claim 32, wherein the result is retrieved from a result array.

34. The computer-readable medium of claim 33, wherein the indication of the longest matching prefix node includes an address or pointer to the result.

35. An apparatus for manipulating a tree data structure representing a plurality of prefixes partitioned into a plurality of strides of a number of tree levels greater than one, each of the plurality of strides represented by a tree bitmap and indications of child paths represented by a child bitmap, said apparatus comprising:

means for retrieving a current-level data structure element corresponding to a current-level stride, the current-level data structure element including a current-level tree bitmap, a current-level child bitmap, and a single link to a next-level data structure element; the current-level tree bitmap corresponding to a current level stride in the tree data structure, the current-level tree bitmap including a plurality of tree bitmap bits, each of the plurality of tree bitmap bits corresponding to a particular one of a plurality of nodes, the value of a bit of the plurality of tree bitmap bits indicating a corresponding node as a prefix node or a vacant node, the plurality of nodes representing multiple tree levels, a lowest-level subset of the plurality of nodes corresponding to a lowest level of said tree levels in the current level stride, the lowest-level subset including a plurality of said plurality of nodes; the current-level child bitmap corresponding to the current level stride, the current-level tree child including a plurality of child bitmap bits, each of the plurality of child bitmap bits corresponding to a particular child path of one of the lowest-level subset of the plurality of nodes, the value of a bit of the plurality of child bits indicating a presence or absence of the corresponding child path;

means for evaluating the current-level tree bitmap against a current-level portion of a search string to determine a longest matching prefix node or a no longest prefix match, and updating an indication of the longest matching prefix node in response to said determination of the longest matching prefix node;

means for evaluating the current-level child bitmap against the current-level portion of the search string to determine a child stride for a next-level or a no child indication; and means for retrieving a result based on the indication of the longest matching prefix node in response to said determination of the no child indication.

36. The apparatus of claim 35, wherein the result is encoded in a result array; and said means for retrieving a result includes means for parsing the result array.

* * * * *

UNITED STATES PATENT AND TRADEMARK OFFICE
CERTIFICATE OF CORRECTION

PATENT NO. : 6,560,610 B1
DATED : May 6, 2003
INVENTOR(S) : Eatherton and Dittia It is certified that error appears in the above-identified patent and that said Letters Patent is hereby corrected as shown below:

Column 6,
Line 25, "$2^5-1$" with -- $2^s-1$ --
Line 34, replace "$2^5$" with -- $2^s$ --
Line 38, replace "$b-1+2^{(5+1)}$" with -- $b-1+2^{(s+1)}$ --

Column 10,
Line 13, replace "dabase" with -- database --
Line 35, replace "6," with -- 6. --
Line 37, after "may" insert -- recommend --
Line 48, replace "acoonmplished" with -- accomplished --
Line 49, replace "fixes" with -- prefixes --

Column 11,
Line 49, replace "itself" with -- itself. --

Column 15,
Line 27, replace "describing.the" with -- describing the --

Signed and Sealed this

Twenty-fifth Day of January, 2005

JON W. DUDAS
*Director of the United States Patent and Trademark Office*